US006570989B1

(12) United States Patent
Ohmori et al.

(10) Patent No.: US 6,570,989 B1
(45) Date of Patent: May 27, 2003

(54) CRYPTOGRAPHIC PROCESSING APPARATUS, CRYPTOGRAPHIC PROCESSING METHOD, AND STORAGE MEDIUM STORING CRYPTOGRAPHIC PROCESSING PROGRAM FOR REALIZING HIGH-SPEED CRYPTOGRAPHIC PROCESSING WITHOUT IMPAIRING SECURITY

(75) Inventors: Motoji Ohmori, Hirakata (JP); Kaoru Yokota, Ashiya (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/296,072

(22) Filed: Apr. 21, 1999

(30) Foreign Application Priority Data

Apr. 27, 1998 (JP) ............................................ 10-116758
Apr. 27, 1998 (JP) ............................................ 10-116759

(51) Int. Cl.⁷ .............................. H04L 9/00; H04L 9/32; G06F 11/30
(52) U.S. Cl. ......................... 380/42; 713/179; 713/193
(58) Field of Search ........................................... 380/42

(56) References Cited

U.S. PATENT DOCUMENTS

| 4,157,454 A | | 6/1979 | Becker | |
|---|---|---|---|---|
| 4,751,733 A | | 6/1988 | Dalayaye et al. | |
| 5,214,704 A | * | 5/1993 | Mittenthal | 380/37 |
| 5,235,423 A | * | 8/1993 | Dunbar et al. | 380/42 |
| 5,412,729 A | * | 5/1995 | Liu | 380/37 |

FOREIGN PATENT DOCUMENTS

| EP | 202989 | 11/1986 |
|---|---|---|
| EP | 0 618 701 A2 | 11/1994 |

OTHER PUBLICATIONS

"The Blowfish Encryption Algorithm," by B. Schneier, Dr. Dobb's Journal, No. 4, Apr. 1, 1994.
"Fast Software Encryption", Lecture Notes in Computer Science, Cambridge Security Workshop, Cambridge, U.K., Dec. 9–11, 1993 Proceedings.

* cited by examiner

Primary Examiner—Thomas R. Peeso
Assistant Examiner—Kambiz Zand

(57) ABSTRACT

To provide a cryptographic processing apparatus that cryptographically processes input data using substitution table data to generate output data. A storing unit stores $(2^N)$ sets of substitution data that each have a predetermined number of bits, where N is an integer no less than 2. A dividing unit divides the input data which is (N×M) bits long into M sets of N-bit subdata, where M is an integer no less than 2. A substituting unit receives an input that is any of: the M sets of N-bit subdata; and at least one set of N-bit input merged data generated by performing a merge process on the M sets of N-bit subdata, specifies one of the $(2^N)$ sets of substitution data in the storing unit for each N bits of the input, and outputs the set of substitution data specified for each N bits of the input. A fixed conversion performing unit performs a plurality of different fixed conversions on at least one set of substitution data outputted from the substituting unit, to generate M sets of converted data that each have the predetermined number of bits. An output data generating unit generates the output data that is (N×M) bits long, based on the M sets of converted data generated by the fixed conversion performing means.

15 Claims, 18 Drawing Sheets

FIG. 18

| BLOCK No. t | ACTUAL KEY DATA | INPUT KEY DATA | SUBSTITUTION TABLE DATA |
|---|---|---|---|
| 0 | K[0] | K[0](+)IV | TG(K[0]) |
| 1 | – | K[0](+)C0 | TG(K[0]) |
| 2 | – | K[0](+)C1 | TG(K[0]) |
| ... | ... | ... | ... |
| 31 | – | K[0](+)C30 | TG(K[0]) |
| 32 | – | K[0](+)IV | TG(K[0]) |
| 33 | – | K[0](+)C32 | TG(K[0]) |
| ... | ... | ... | ... |
| 1023 | – | K[0](+)C1022 | TG(K[0]) |
| 1024 | K[1] | K[1](+)IV | TG(K[1]) |
| 1025 | – | K[1](+)C1024 | TG(K[1]) |
| ... | ... | ... | ... |

RESET OF INPUT KEY DATA → (at block 32)

RENEWAL OF INPUT KEY DATA AND SUBSTITUTION TABLE DATA → (at block 1024)

CRYPTOGRAPHIC PROCESSING APPARATUS, CRYPTOGRAPHIC PROCESSING METHOD, AND STORAGE MEDIUM STORING CRYPTOGRAPHIC PROCESSING PROGRAM FOR REALIZING HIGH-SPEED CRYPTOGRAPHIC PROCESSING WITHOUT IMPAIRING SECURITY

This application is based on applications Nos. H10-116758 and H10-116759 filed in Japan, the contents of which are hereby incorporated by reference.

BACKGROUND OF THE INVENTION

1. Field of the Invention

The present invention relates to a cryptographic processing apparatus for encrypting/decrypting data in units of blocks based on a secret key, a cryptographic processing method used in the cryptographic processing apparatus, and a storage medium storing a cryptographic processing program for the cryptographic processing method. The present invention especially relates to a cryptographic processing technique that realizes high-speed cryptographic processing by reducing the amount of substitution table data and the frequency of generation of substitution table data, without loss of security.

2. Description of the Prior Art

As communications of various kinds of information, such as remittance by digital communications, have become widespread in recent years, there has been the growing need for techniques that protect important messages against tapping and tampering by unauthorized third parties. A representative of such techniques effective for improving security is a technique called cryptography.

In communication systems using cryptography, the original message is called "plaintext", the result of converting the plaintext so as to make it unintelligible to third parties is called "ciphertext", the conversion for the plaintext is called "encryption", and the reverse conversion for the ciphertext to recover the original plaintext is called "decryption".

A pattern of encryption and decryption is determined by an algorithm and a key which is used as a parameter for the algorithm. The algorithm specifies a family of conversions, while the key specifies one of the conversions in the family. In general, the algorithm is unchanged in a cryptographic processing apparatus, while the key is occasionally changed in the apparatus.

It is assumed that ciphertexts are vulnerable to tapping. An act of decoding a captured ciphertext to obtain the original message by an attacker without knowledge of an algorithm and a key is called "cryptanalysis".

Here, such an attacker (hereinafter "cryptanalyst") performs cryptanalysis on the assumption that ciphertexts are known.

Cryptanalysis of deriving a secret plaintext or key only from a ciphertext is called "ciphertext-only attack", whereas cryptanalysis of determining a secret key from arbitrary pairs of ciphertexts and plaintexts and specifying a plaintext corresponding to a given ciphertext is called "known-plaintext attack".

<First Example of Conventional Techniques>

One example of conventional cryptosystems is the pseudorandom-number-add-type cryptography.

In this technique, the sender and the receiver each hold an identical secret key in secrecy and generate a random number of a predetermined bit length (hereinafter, "block") using the secret key as a seed in a random number generator that contains an identical algorithm. During encryption the sender performs an exclusive-OR operation for corresponding bits in the random number and each block of a plaintext to generate a ciphertext. During decryption the receiver performs an exclusive-OR operation for corresponding bits in the random number and each block of the ciphertext to obtain the original plaintext.

Let "M" be each block of the plaintext, "C" be each block of the ciphertext, "R" be the random number, and "(+)" be an exclusive-OR operation for corresponding bits. The encryption and the decryption can be expressed respectively as $$C=M(+)R \quad \text{(Formula 1)}$$

$$M=C(+)R \quad \text{(Formula 2)}$$

A drawback of this cryptography is that it is vulnerable to known-plaintext attack.

Suppose a pair of a plaintext block and a ciphertext block is known. The random number R can be derived using the following Formula 3, and as a result the other plaintext blocks can be obtained.

$$R=M(+)C \quad \text{(Formula 3)}$$

Thus, cryptanalysts can easily decode pseudorandom-number-add-type ciphertexts by known-plaintext attack.

<Second Example of Conventional Techniques>

On the other hand, cryptosystems such as the Data Encryption Standard (DES) and the Fast Data Encipherment Algorithm (FEAL) are relatively secure against known-plaintext attack. For details on these methods, see Eiji Okamoto *An Introduction to Encryption Theory*, published by Kyoritsu.

In these cryptosystems, data is divided into blocks of 64 bits and intensely shuffled in units of blocks. In the case of the DES algorithm, a data shuffling process which combines transposition with substitution is repeated for sixteen stages for each block.

One example of the block ciphers represented by DES and FEAL is the Blowfish cipher (for details on this cipher, see Bruce Schneier "Description of a New Variable-Length Key, 64-Bit Block Cipher (Blowfish)" in Ross Anderson (ed.) *Fast Software Encryption*, Lecture Notes in Computer Science, vol. 809, pp.191–204, published by Springer-Verlag).

The following is a description of the Blowfish cipher.

FIG. 1 shows the configuration of a data encrypting apparatus that uses the Blowfish cipher.

In the figure, a data encrypting apparatus 3010 is roughly composed of a data shuffling unit 3011, a stage number controlling unit 3012, a subkey generating unit 3013, and a substitution table data generating unit 3014.

The substitution table data generating unit 3014 generates 32K-bit substitution table data (1024 table values that are each 32 bits long) from 64-bit input key data according to a substitution table data generating algorithm. The substitution table data generating algorithm is not a main feature of the present invention and so its explanation is omitted here.

The subkey generating unit 3013 generates 256-bit data from the 64-bit input key data according to a subkey generating algorithm and divides the 256-bit data into eight sets of 32-bit subkey data SK0~SK7. Since the subkey generating algorithm is not a main feature of the present invention, its explanation is omitted here.

The data shuffling unit 3011 performs data shuffling for 64-bit input plaintext data (hereinafter "plaintext block")

using the 32K-bit substitution table data generated by the substitution table data generating unit 3014 and 32-bit subkey data generated by the subkey generating unit 3013, and outputs obtained 64-bit data. In general, data shuffling is repeated 16 times to generate 64-bit ciphertext data (hereinafter "ciphertext block").

The stage number controlling unit 3012 controls the number times data shuffling is performed by the data shuffling unit 3011 to generate a ciphertext block from a plaintext block. The stage number controlling unit 3012 counts the number of times data shuffling is performed for each plaintext block. If the counted number is less than a predetermined number, the stage number controlling unit 3012 inputs output data of the data shuffling unit 3011 in the data shuffling unit 3011. If the counted number reaches the predetermined number, the stage number controlling unit 3012 outputs the output data as a ciphertext block.

Here, subkey SK0 is used to perform first data shuffling for a plaintext block, and then data shuffling is repeated using subkeys SK1~SK7 one by one. After subkey SK7, subkey SK0 is used again.

FIG. 2 shows the configuration of a data decrypting apparatus that uses the Blowfish cipher.

In the figure, a data decrypting apparatus 4010 is roughly composed of a data shuffling unit 4011, a stage number controlling unit 4012, a subkey generating unit 4013, and a substitution table data generating unit 4014.

The data shuffling unit 4011, the subkey generating unit 4013, and the substitution table data generating unit 4014 are the same as the data shuffling unit 3011, the subkey generating unit 3013, and the substitution table data generating unit 3014 in FIG. 1.

The stage number controlling unit 4012 controls the number of times data shuffling is performed by the data shuffling unit 4011 to generate a plaintext block from a ciphertext block. The stage number controlling unit 4012 counts the number of times data shuffling is performed for each ciphertext block. If the counted number is less than a predetermined number, the stage number controlling unit 4012 inputs output data of the data shuffling unit 4011 in the data shuffling unit 4011. If the counted number reaches the predetermined number, the stage number controlling unit 4012 outputs the output data as a plaintext block.

Here, subkey SK7 is used to perform first data shuffling for a ciphertext block, and then data shuffling is repeated using subkeys SK6~SK0 one by one. Subkey SK7 is used again after subkey SK0.

FIG. 3 shows the detailed construction of the data shuffling unit 3011 shown in FIG. 1.

This data shuffling unit 3011 includes a first exclusive-OR operating unit 3111, a second exclusive-OR operating unit 3112, and a data converting unit 3113.

The first exclusive-OR operating unit 3111 takes an exclusive-OR for corresponding bits in 32-bit subkey data and the higher-order 32 bits ("X1" in FIG. 3) of 64-bit input data and outputs resultant 32-bit data S0. This S0 is inputted in the data converting unit 3113 and at the same time becomes the lower-order 32 bits ("Y0" in FIG. 3) of 64-bit output data.

The data converting unit 3113 is the so-called f function. The data converting unit 3113 converts the 32-bit data S0 using the 32K-bit substitution table data and outputs 32-bit converted data S1.

The second exclusive-OR operating unit 3112 takes an exclusive-OR for corresponding bits in the 32-bit data S1 and the lower-order 32 bits ("X0" in FIG. 3) of the 64-bit input data and outputs resultant 32-bit data Y1. This Y1 becomes the higher-order 32 bits of the 64-bit output data.

More specifically, the data shuffling unit 3011 operates as follows.

(1) First, 64-bit input data is divided into the higher-order 32 bits X1 and the lower-order 32 bits X0.

(2) The first exclusive-OR operating unit 3111 finds an exclusive-OR for corresponding bits in the 32-bit data X1 and 32-bit subkey data. As a result, 32-bit data S0 is generated and set as the lower-order 32 bits Y0 of 64-bit output data.

(3) The data converting unit 3113 converts the 32-bit data S0 and outputs 32-bit converted data S1.

(4) The second exclusive-OR operating unit 3112 finds an exclusive-OR for corresponding bits in the 32-bit data S1 and the 32-bit data X0. As a result, 32-bit data is generated and set as the higher-order 32 bits Y1 of the 64-bit output data.

The 64-bit output data made up of Y1 and Y0 is then outputted from the data shuffling unit 3011 in synchronism with a clock (not illustrated).

FIG. 4 shows the detailed construction of the data shuffling unit 4011 shown in FIG. 2.

This data shuffling unit 4011 includes a first exclusive-OR operating unit 4111, a second exclusive-OR operating unit 4112, and a data converting unit 4113.

The first exclusive-OR operating unit 4111 performs an exclusive-OR operation for corresponding bits in 32-bit subkey data and the lower-order 32 bits ("Z0" in FIG. 4) of 64-bit input data and outputs resultant 32-bit data W1. This W1 becomes the higher-order 32 bits of 64-bit output data. Meanwhile, Z0 is inputted in the data converting unit 4113 as 32-bit data T0.

The data converting unit 4113 is the so-called f function as the data converting unit 3113. The data converting unit 4113 converts the 32-bit data T0 using the 32K-bit substitution table data and outputs 32-bit converted data T1.

The second exclusive-OR operating unit 4112 performs an exclusive-OR operation for corresponding bits in the 32-bit data T1 and the higher-order 32 bits ("Z1" in FIG. 4) of the 64-bit input data and outputs resultant 32-bit data W0. This W0 becomes the lower-order 32 bits of the 64-bit output data.

The specific operation of the data shuffling unit 4011 is similar to the data shuffling unit 3011, so that its explanation is omitted.

FIG. 5 shows the detailed construction of the data converting unit 3113 shown in FIG. 3.

This data converting unit 3113 includes a first substitution table data storing unit 3201, a second substitution table data storing unit 3202, a third substitution table data storing unit 3203, a fourth substitution table data storing unit 3204, a first adding unit 3205, a second adding unit 3206, and an exclusive-OR operating unit 3207.

The 32K-bit substitution table data is divided from the highest-order bit into four sets of 8K-bit substitution table data R3, R2, R1, and R0.

The 32-bit input data S0 is divided from the highest-order bit into four sets of 8-bit data V3, V2, V1, and V0.

The first to fourth substitution table data storing units 3201~3204 respectively store the four sets of 8K-bit substitution table data R3, R2, R1, and R0, where each set of 8K-bit substitution table data is divided from the highest-order bit into 256 table values that are each 32 bits long. The four sets of 8-bit data V3, V2, V1, and V0 are respectively inputted in the first to fourth substitution table data storing units 3201~3204, and the first to fourth substitution table data storing units 3201~3204 respectively specify and output one of the 256 stored table values based on V3~V1. In the present example, 256 32-bit table values stored in the first substitution table data storing unit 3201 are set as Tab1[0], Tab1[1], ..., and Tab1[255] in order of decreasing bits. Similarly, 256 32-bit table values stored in the second substitution table data storing unit 3202 are set as Tab2[0], Tab2[1], ..., and Tab2[255], 256 32-bit table values stored in the third substitution table data storing unit 3203 are set as Tab3[0], Tab3[1], ..., and Tab3[255], and 256 32-bit table values stored in the fourth substitution table data storing unit 3204 are set as Tab4[0], Tab4[1], ..., and Tab4[255].

The first adding unit 3205 performs an arithmetic addition on a 32-bit table value outputted from the first substitution table data storing unit 3201 and a 32-bit table value outputted from the second substitution table data storing unit 3202, and outputs resultant lower-order 32-bit data, ignoring any carry beyond the 32nd bit.

When the 32-bit table value outputted from the first substitution table data storing unit 3201 is set as "J3", the 32-bit table value outputted from the second substitution table data storing unit 3202 is set as "J2", and the 32-bit data outputted from the first adding unit 3205 is set as "Q0", the above addition is expressed as $$Q0=(J3+J2) \mod (2^{\wedge}32)$$

where "a^b" represents the "b"th power of a, and "α mod β" represents a remainder when α is divided by β. These representations apply to the formulas given below.

The exclusive-OR operating unit 3207 performs an exclusive-OR operation for corresponding bits in the 32-bit data Q0 and a 32-bit table value outputted from the third substitution table data storing unit 3203, and outputs resultant 32-bit data.

When the 32-bit table value outputted from the third substitution table data storing unit 3203 is set as "J1" and the 32-bit data outputted from the exclusive-OR operating unit 3207 is set as "Q1", the operation of the exclusive-OR operating unit 3207 is expressed as $$Q1=Q0(+)J1$$

where "α(+)β" represents an exclusive-OR operation for corresponding bits in α and β.

The second adding unit 3206 performs an arithmetic addition on the 32-bit data Q1 and a 32-bit table value outputted from the fourth substitution table data storing unit 3204 and outputs resultant lower-order 32-bit data, ignoring any carry beyond the 32nd bit.

When the 32-bit table value outputted from the fourth substitution table data storing unit 3204 is set as "J0" and the 32-bit data outputted from the second adding unit 3206 is set as "Q2", the operation of the second adding unit 3206 is expressed as $$Q2=(Q1+J0) \mod (2^{\wedge}32)$$

where Q2 is 32-bit output data S1 of the data converting unit 3113.

The operation of this data converting unit 3113 is as follows.

(1) 32K-bit input substitution table data is divided from the highest-order bit into four sets of substitution table data R3, R2, R1, and R0 which are each made up of 256 32-bit table values. R3~R0 are then respectively stored in the first to fourth substitution table data storing units 3201~3204.

(2) 32-bit input data S0 is divided from the highest-order bit into four sets of 8-bit data V3, V2, V1, and V0, which are then respectively inputted in the first to fourth substitution table data storing units 3201~3204.

(3) The first to fourth substitution table data storing units 3201~3204 respectively specify and output one of the 256 stored table values based on V3~V0. As a result, four 32-bit table values J3~J0 are outputted respectively from the first to fourth substitution table data storing units 3201~3204.

(4) The first adding unit 3205 performs an arithmetic addition on J3 and J2 and outputs resultant lower-order 32-bit data Q0, ignoring any carry beyond the 32nd bit.

(5) The exclusive-OR operating unit 3207 performs an exclusive-OR operation for corresponding bits in Q0 and J1 and outputs resultant 32-bit data Q1.

(6) The second adding unit 3206 performs an arithmetic addition on Q1 and J0 and outputs resultant lower-order 32 bits Q2 (=S1), ignoring any carry beyond the 32nd bit.

The security of a data cryptosystem that uses the above data shuffling unit 3011 greatly depends on a data shuffling function of the conversion operations performed in the data converting unit 3113. Since the data converting unit 3113 is equipped with the four substitution table data storing units 3201~3204 which operate separately from each other, this cryptosystem is highly secure against cryptanalysis and other unauthorized attacks.

The data converting unit 4113 shown in FIG. 4 has the same construction as the data converting unit 3113 and thus is not explained here.

<Third Example of Conventional Techniques>

Representative cryptanalysis techniques used against the block ciphers are differential cryptanalysis and linear cryptanalysis. A cryptosystem of the third example has been designed to enhance resistance to such cryptanalysis techniques. Differential cryptanalysis and linear cryptanalysis are described in detail in E. Biham & A. Shamir *Differential Cryptanalysis of the Data Encryption Standard*, published by Springer-Verlag, and M. Matsui "Linear Cryptanalysis Method for DES Cipher (I)" in 1993 *Symposium on Cryptography and Information Security* (SCIS '93), *Lecture Notes* SCIS93-3C.

Differential cryptanalysis and linear cryptanalysis belong to known-plaintext attack that specifies key data by analyzing a plurality of pairs of plaintexts and ciphertexts. These cryptanalysis techniques are built on premises that all ciphertext blocks of a ciphertext to be decoded have been generated using the same key data.

Therefore, by using different key data to encrypt each plaintext block, it is possible to strengthen cryptographic security against these cryptanalysis techniques.

Here, it is not practical to prepare the same number of sets of key data as the number of plaintext blocks, since more sets of key data have to be prepared for more plaintext blocks. To avoid this, a method that uses an immediately preceding ciphertext block as variable information to renew key data is disclosed in the U.S. Pat. No. 4,074,066 (Message Verification and Transmission Error Detection by Block Chaining (Japanese Patent No. 1250077)). According to this method, key data is renewed whenever a plaintext block is encrypted, without preparing the same number of sets of key data as plaintext blocks. Since new key data is generated from original key data every time a plaintext block is encrypted, protection against differential cryptanalysis and linear cryptanalysis can be enhanced without an increase in the amount of key data.

However, in the second example the data shuffling unit 3011 has to store an enormous amount of substitution key data (32K bits) and so is problematic in terms of simplicity of hardware and software implementations. Also, considerable processing time is necessary to generate such a large amount of substitution key data. Nevertheless, it is not desirable to reduce the amount of substitution table data, since it would impair cryptographic security.

When the key chaining method in the third example is applied to the Blowfish cipher in the second example, the following problem arises.

As described above, the Blowfish cipher in the second example generates 32K-bit substitution table data from input key data, while the key chaining method in the third example renews input key data each time a plaintext block is encrypted. Accordingly, when the key chaining method is used in the Blowfish cipher, new substitution table data is generated each time a plaintext block is encrypted. Since the amount of substitution table data is enormous (32K bits), such frequent generation of substitution table data will cause a considerable burden on a processor and seriously decrease processing speed for cryptography. Yet it is equally undesirable to reduce the number of times substitution table data is generated, as it may result in degradation in cryptographic security.

The above difficulties are present not only in the Blowfish cipher but also in other block ciphers that perform cryptographic processing using substitution table data generated from input key data.

SUMMARY OF THE INVENTION

In view of the above stated problems, the present invention aims to provide a cryptographic processing apparatus, a cryptographic processing method, and a storage medium storing a cryptographic processing program that realize high-speed cryptographic processing without loss of security by reducing the amount of substitution table data and the frequency of generation of substitution table data, in a block cipher such as the Blowfish cipher which generates substitution table data based on input key data for the use of cryptographic processing.

The above object can be fulfilled by a cryptographic processing apparatus for cryptographically processing input data using a plurality of sets of substitution data to generate output data, the cryptographic processing apparatus including: a storing unit for storing ($2^N$) sets of substitution data that each have a predetermined number of bits, where N is an integer no less than 2; a dividing unit for dividing the input data which is (N×M) bits long into M sets of subdata which are each N bits long, where M is an integer no less than 2; a substituting unit for receiving an input that is any of: the M sets of N-bit subdata; and at least one set of N-bit input merged data obtained as a result that a merge process is performed on the M sets of N-bit subdata, specifying one of the ($2^N$) sets of substitution data in the storing unit for each N bits of the input, and outputting the set of substitution data specified for each N bits of the input; a fixed conversion performing unit for performing a plurality of different fixed conversions on at least one set of substitution data outputted from the substituting unit, to generate M sets of converted data that each have the predetermined number of bits; and an output data generating unit for generating the output data that is (N×M) bits long, based on the M sets of converted data generated by the fixed conversion performing unit.

With this construction, high cryptographic security is attained with a small amount of substitution table data, so that a cryptographic processing apparatus that is preferable in terms of simplicity in hardware/software implementations can be realized.

Here, the predetermined number may be (N×M), wherein the substituting unit specifies M sets of substitution data, among the ($2^N$) sets of substitution data in the storing unit, respectively for the M sets of N-bit subdata, and outputs the specified M sets of substitution data that are each (N×M) bits long, wherein the fixed conversion performing unit performs M different fixed conversions respectively on the M sets of substitution data outputted from the substituting unit, to generate the M sets of converted data that are each (N×M) bits long, and wherein the output data generating unit performs a merge process on the generated M sets of converted data to generate the output data that is (N×M) bits long.

With this construction, the size of substitution table data is reduced to 1/M the size of substitution table data in the conventional techniques without impairing security, so that a cryptographic processing apparatus preferable in terms of simplicity in hardware/software implementations can be realized.

Here, the predetermined number may be N, wherein the substituting unit includes an input merging unit for performing a global merge process on the M sets of N-bit subdata to generate a set of N-bit input merged data, specifies one of the ($2^N$) sets of substitution data in the storing unit for the set of N-bit input merged data, and outputs the specified set of substitution data that is N bits long, wherein the fixed conversion performing unit performs each of M different fixed conversions on the set of substitution data outputted from the substituting unit, to generate the M sets of converted data that are each N bits long, and wherein the output data generating unit includes: an output merging unit for performing an individual merge process on each of the M sets of subdata and a different one of the M sets of converted data that corresponds to the set of subdata, to generate M sets of output merged data which are each N bits long; and a combining unit for combining the M sets of output merged data generated by the output merging unit to form the output data that is (N×M) bits long.

With this construction, the size of substitution table data is reduced to 1/M the size of substitution table data in the conventional techniques without impairing security, so that a cryptographic processing apparatus preferable in terms of simplicity in hardware/software implementations can be realized.

The above object can also be fulfilled by a cryptographic processing apparatus for generating a set of substitution table data and cryptographically processing input data using the set of substitution table data to generate output data, the cryptographic processing apparatus including: a key data storing unit for storing a set of key data; a substitution table data storing unit for storing a set of substitution table data; a block generating unit for dividing the input data into input blocks that each have a predetermined number of bits and outputting the input blocks one by one; a substitution table data generating unit for generating a set of substitution table data and replacing a set of substitution table data in the substitution table data storing unit with the generated set of substitution table data, when an input block is to be cryptographically processed immediately after a specified number of input blocks are cryptographically processed; a key data converting unit for converting, when an input block is to be cryptographically processed after an input block immediately preceding the input block is cryptographically processed, a set of key data in the key data storing unit by performing a bit conversion on the set of key data using an output block generated as a result that the immediately preceding input block is cryptographically processed; and a cryptographic processing unit for cryptographically processing an input block outputted from the block generating unit to generate an output block, using a set of substitution table data in the substitution table data storing unit and any of a converted set of key data generated by the key data converting unit and a set of key data stored in the key data storing unit.

The above object can also be fulfilled by a cryptographic processing apparatus for generating a set of substitution table data and cryptographically processing input data using the set of substitution table data to generate output data, the cryptographic processing apparatus including: a key data storing unit for storing a set of key data; a substitution table data storing unit for storing a set of substitution table data; a block generating unit for dividing the input data into input blocks that each have a predetermined number of bits and outputting the input blocks one by one; a substitution table data generating unit for generating a set of substitution table data and replacing a set of substitution table data in the substitution table data storing unit with the generated set of substitution table data, when an input block is to be cryptographically processed immediately after a specified number of input blocks are cryptographically processed; a key data converting unit for converting, when an input block is to be cryptographically processed after an input block immediately preceding the input block is cryptographically processed, a set of key data in the key data storing unit by performing a bit conversion on the set of key data using the immediately preceding input block; and a cryptographic processing unit for cryptographically processing an input block outputted from the block generating unit to generate an output block, using a set of substitution table data in the substitution table data storing unit and any of a converted set of key data generated by the key data converting unit and a set of key data stored in the key data storing unit.

The above object can also be fulfilled by a cryptographic processing apparatus for generating a set of substitution table data and cryptographically processing input data using the set of substitution table data to generate output data, the cryptographic processing apparatus including: a key data storing unit for storing a set of key data; a substitution table data storing unit for storing a set of substitution table data; a block generating unit for dividing the input data into input blocks that each have a predetermined number of bits and outputting the input blocks one by one; a substitution table data generating unit for generating a set of substitution table data and replacing a set of substitution table data in the substitution table data storing unit with the generated set of substitution table data, when an input block is to be cryptographically processed immediately after a specified number of input blocks are cryptographically processed; a key data converting unit for converting, when an input block is to be cryptographically processed after an input block immediately preceding the input block is cryptographically processed, a set of key data in the key data storing unit by performing a bit conversion on the set of key data using an intermediate block generated during cryptographic processing for the immediately preceding input block; and a cryptographic processing unit for cryptographically processing an input block outputted from the block generating unit through use of a set of substitution table data in the substitution table data storing unit and any of a converted set of key data generated by the key data converting unit and a set of key data stored in the key data storing unit, to generate an intermediate block during cryptographic processing for the input block and generate an output block as a result of the cryptographic processing for the input block.

With this construction, while key data is renewed every time an input block is cryptographically processed, substitution table data derived from key data is not renewed in response to every renewal of key data but renewed only when a specific number of input blocks are cryptographically processed. Accordingly, a cryptographic processing apparatus that performs high-speed cryptographic processing without loss of security can be realized.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 18 shows the correspondence of block No. t, actual key data, input key data, and substitution table data.

DESCRIPTION OF THE PREFERRED EMBODIMENT(S)

First Embodiment

Figure 5:
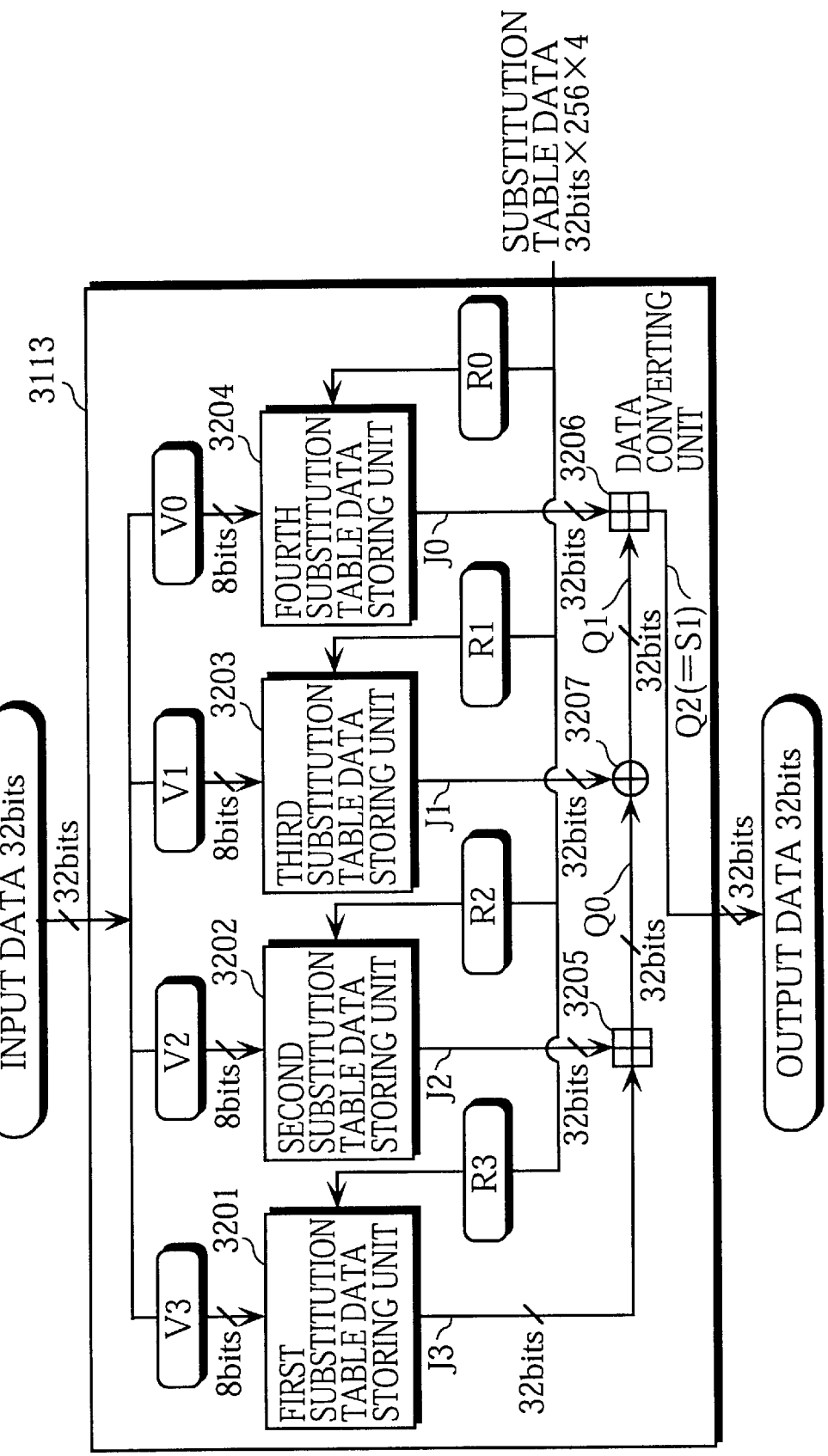
FIG. 5 shows the detailed construction of a data converting unit 3113 shown in FIG. 3.

If the first to fourth substitution table data storing units 3201~3204 shown in FIG. 5 share one set of substitution table data, the amount of substitution table data stored in the data converting unit 3113 is reduced to ¼ of the original amount, although the following security problem arises.

For instance, when V2=V3 in FIG. 5, the first adding unit 3205 performs an arithmetic addition on two equal values, since the first substitution table data storing unit 3201 and the second substitution table data storing unit 3202 share the set of substitution table data and accordingly J2=J3. Such a cryptosystem has only a low data shuffling function and therefore is insecure against unauthorized attacks.

A cryptographic processing apparatus of the first embodiment of the present invention retrieves a plurality of table values from one set of substitution table data and performs different fixed conversions, such as rotations by different shift bit lengths and additions of different constants, on the plurality of table values. By doing so, the cryptographic processing apparatus realizes encryption and decryption (hereinafter generically called "cryptographic processing") where the amount of substitution table data is reduced without loss of security.

Figure 6:
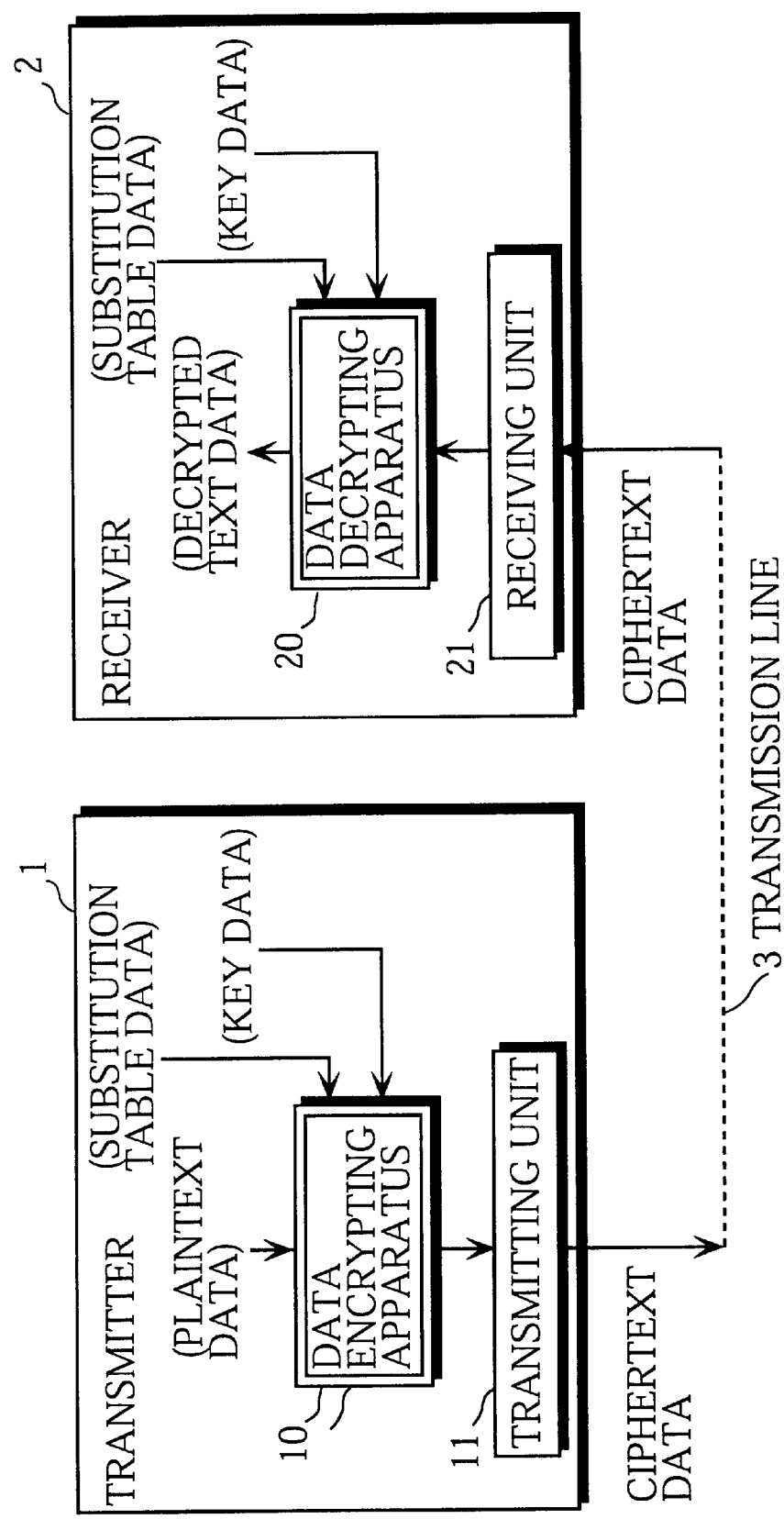
FIG. 6 shows the configuration of an encrypted communication system of the first embodiment of the present invention.

FIG. 6 shows the configuration of an encrypted communication system of the first embodiment of the present invention.

In FIG. 6 and the other figures used in this specification, each component enclosed with a double box (such as data encrypting apparatus 10 and data decrypting apparatus 20 in FIG. 6) is illustrated in detail in a figure that follows.

The encrypted communication system in FIG. 6 includes a transmitter 1 and a receiver 2.

The transmitter 1 and the receiver 2 are, for example, a server and a terminal in a video server system for transmission/reception of digital image information.

The transmitter 1 is equipped with a data encrypting apparatus 10 and a transmitting unit 11.

The data encrypting apparatus 10 encrypts plaintext data in units of 64 bits using 256-bit key data and 8K-bit substitution table data (256 table values which are each 32 bits long) to generate ciphertext data. Here, the plaintext data is, for example, digitally-coded audio or image information. Also, the same key data and substitution table data have been held in secrecy by the transmitter 1 and the receiver 2.

The transmitting unit 11 performs parallel-to-serial conversion, modulation, and amplification on the ciphertext data generated by the data encrypting apparatus 10 and outputs obtained transmission signals onto a transmission line 3.

The receiver 2 is equipped with a data decrypting apparatus and a receiving unit 21.

The receiving unit 21 receives the transmission signals from the transmitting unit 11 via the transmission line 3 and performs the reverse process of the transmitting unit 11 on the transmission signals to recover the ciphertext data.

The data decrypting apparatus 20 decrypts the ciphertext data in units of 64 bits using the 256-bit key data and the 8K-bit substitution table data (256 table values which are each 32 bits long) to obtain decrypted text data (original plaintext data).

The decrypted text data obtained here is, for example, digitally-coded audio or image information. Such information is then decoded by a dedicated decoder (not illustrated) and reproduced via a speaker or a display.

Figure 7:
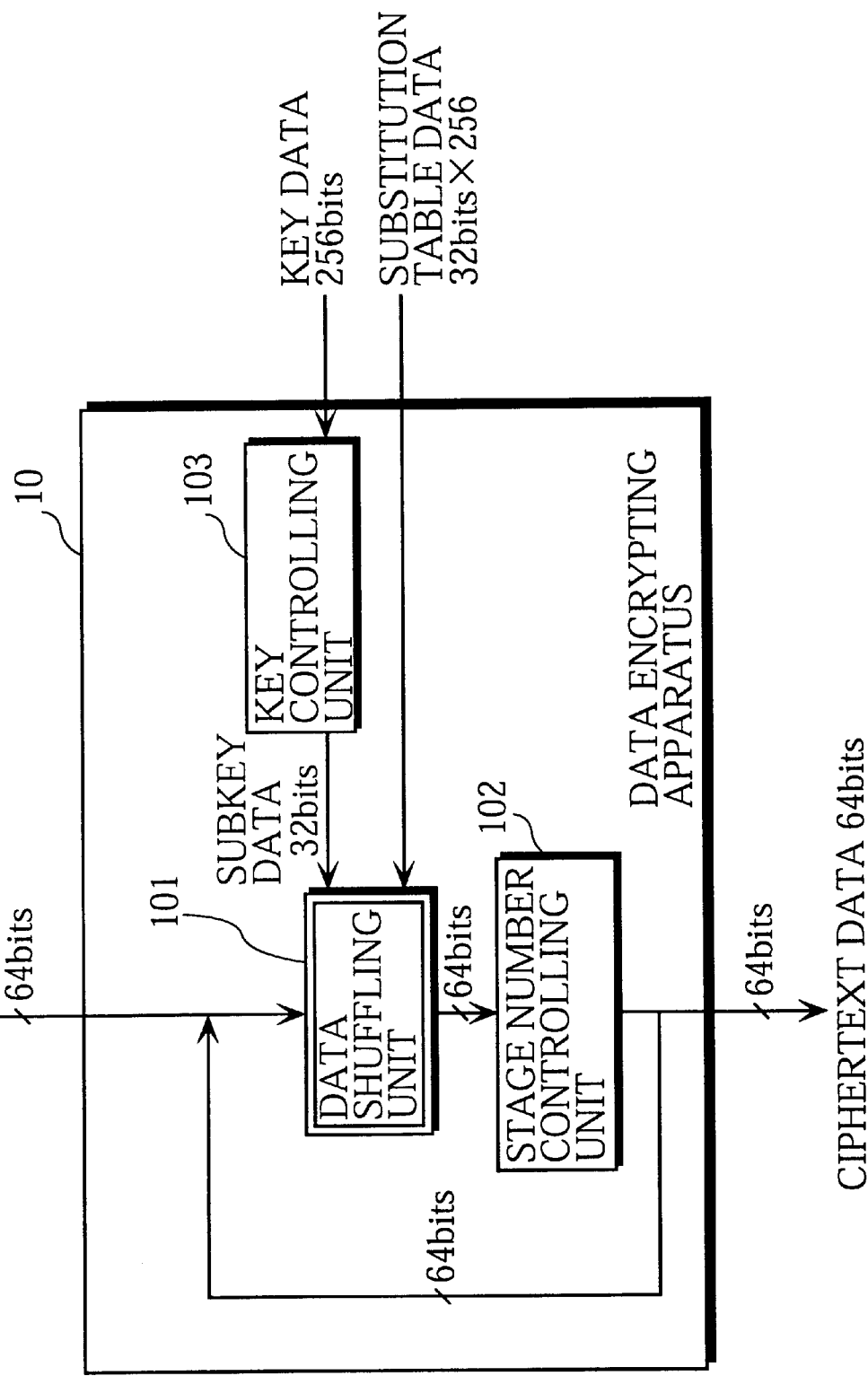
FIG. 7 shows the detailed construction of a data encrypting apparatus 10 shown in FIG. 6.

FIG. 7 shows the detailed construction of the data encrypting apparatus 10 shown in FIG. 6.

This data encrypting apparatus 10 is roughly made up of a data shuffling unit 101, a stage number controlling unit 102, and a key controlling unit 103.

The key controlling unit 103 divides the 256-bit key data from the highest-order bit into eight sets of 32-bit subkey data K0~K7. Each time 64-bit data is inputted in the data shuffling unit 101, the key controlling unit 103 outputs subkey data K0~K7 to the data shuffling unit 101 one at a time. After subkey data K7, subkey data K0 is outputted again.

The data shuffling unit 101 performs data shuffling for 64-bit input data using the 8K-bit substitution table data and 32-bit subkey data and outputs obtained 64-bit data.

The stage number controlling unit 102 controls the number of times data shuffling is performed by the data shuffling unit 101 to generate a ciphertext block from a plaintext block. The stage number controlling unit 102 counts the number of times data shuffling is performed for each plaintext block. If the counted number is less than a predetermined number, 64-bit data outputted from the data shuffling unit 101 is inputted in the data shuffling unit 101 for reshuffling. If the counted number is equal to the predetermined number, the stage number controlling unit 102 outputs 64-bit output data of the data shuffling unit 101 as a ciphertext block. In the present embodiment, the predetermined number is set at 8.

Figure 8:
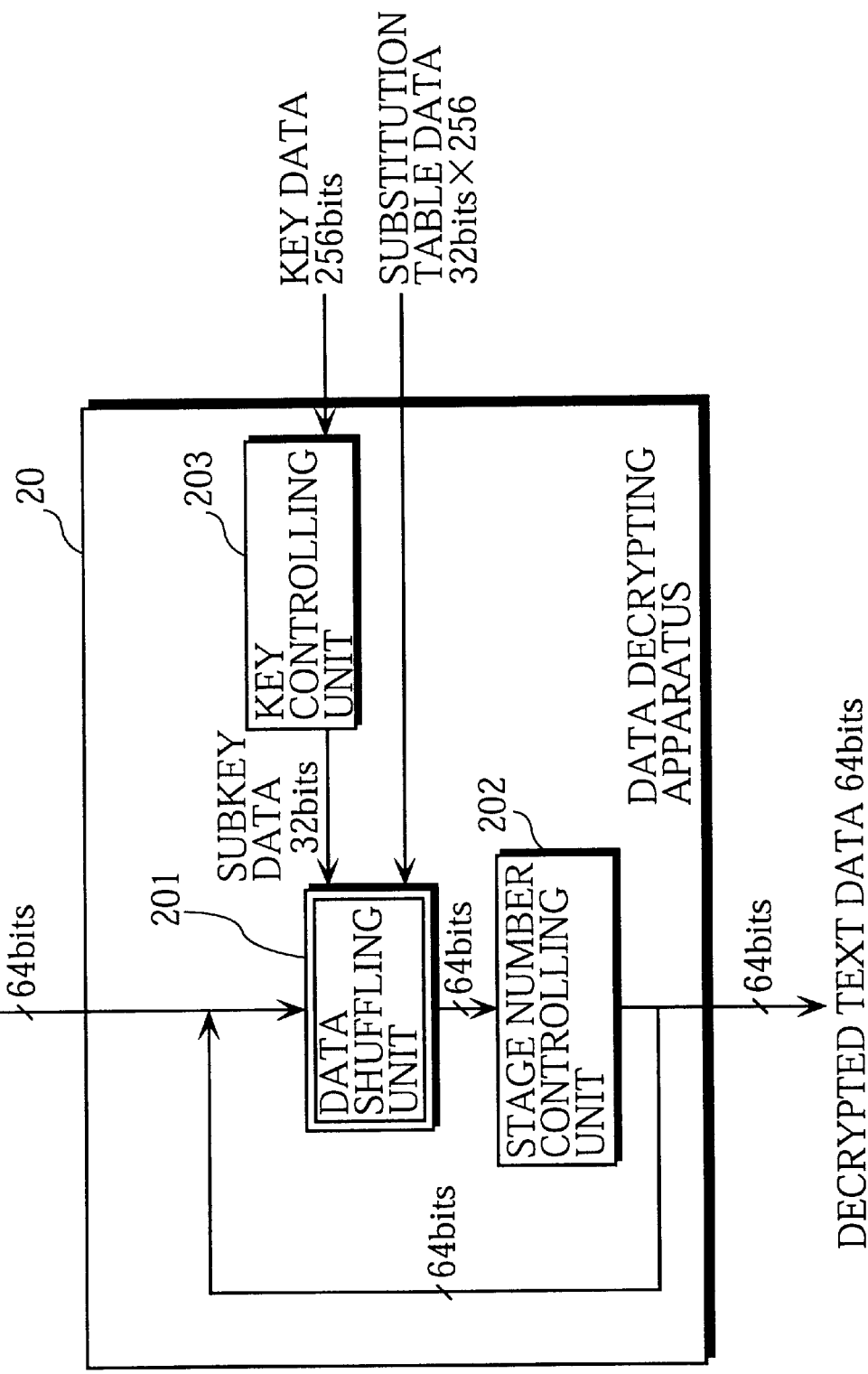
FIG. 8 shows the detailed construction of a data decrypting apparatus 20 shown in FIG. 6.

FIG. 8 shows the detailed construction of the data decrypting apparatus 20 shown in FIG. 6.

This data decrypting apparatus 20 is roughly made up of a data shuffling unit 201, a stage number controlling unit 202, and a key controlling unit 203.

The key controlling unit 203 divides the 256-bit key data from the highest-order bit into eight sets of 32-bit subkey data K0~K7. Each time 64-bit data is inputted in the data shuffling unit 201, the key controlling unit 203 outputs subkey data K7~K0 to the data shuffling unit 201 one at a time. After subkey data K0, subkey data K7 is outputted again.

The data shuffling unit 201 is the same as the data shuffling unit 101 in FIG. 7.

The stage number controlling unit 202 controls the number of times data shuffling is performed by the data shuffling unit 201 to generate 64-bit decrypted text data (hereinafter "decrypted text block") from a ciphertext block. The stage number controlling unit 202 counts the number of times data shuffling is performed for each ciphertext block. If the counted number is less than a predetermined number, 64-bit data outputted from the data shuffling unit 201 is inputted in the data shuffling unit 201 for reshuffling. If the counted number reaches the predetermined number, the stage number controlling unit 202 outputs 64-bit output data of the data shuffling unit 201 as a decrypted text block. Here, the predetermined number is set at 8.

Figure 9:
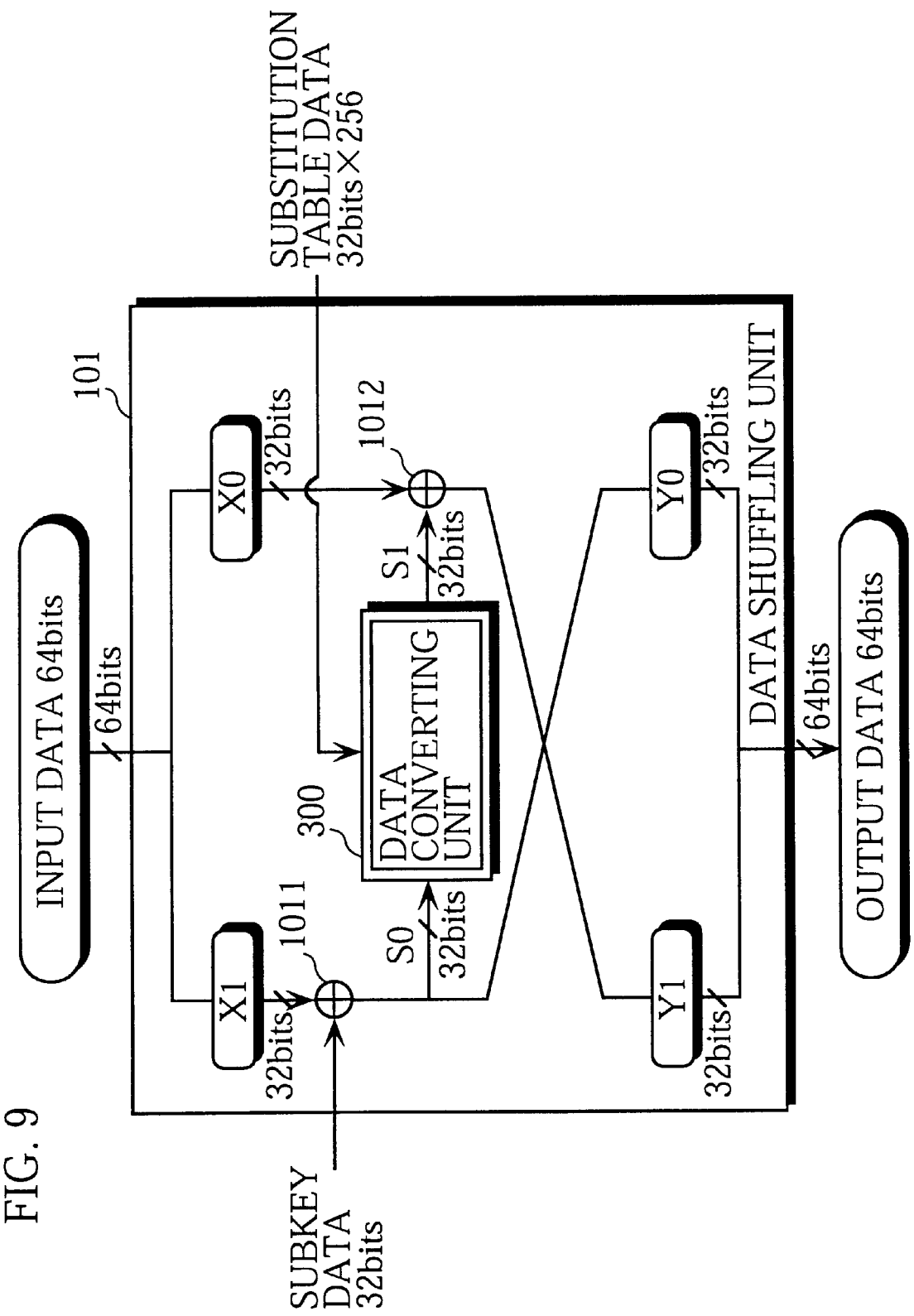
FIG. 9 shows the detailed construction of a data shuffling unit 101 shown in FIG. 7.

FIG. 9 shows the detailed construction of the data shuffling unit 101 shown in FIG. 7.

The data shuffling unit 101 includes a first exclusive-OR operating unit 1011, a second exclusive-OR operating unit 1012, and a data converting unit 300.

Figure 1:
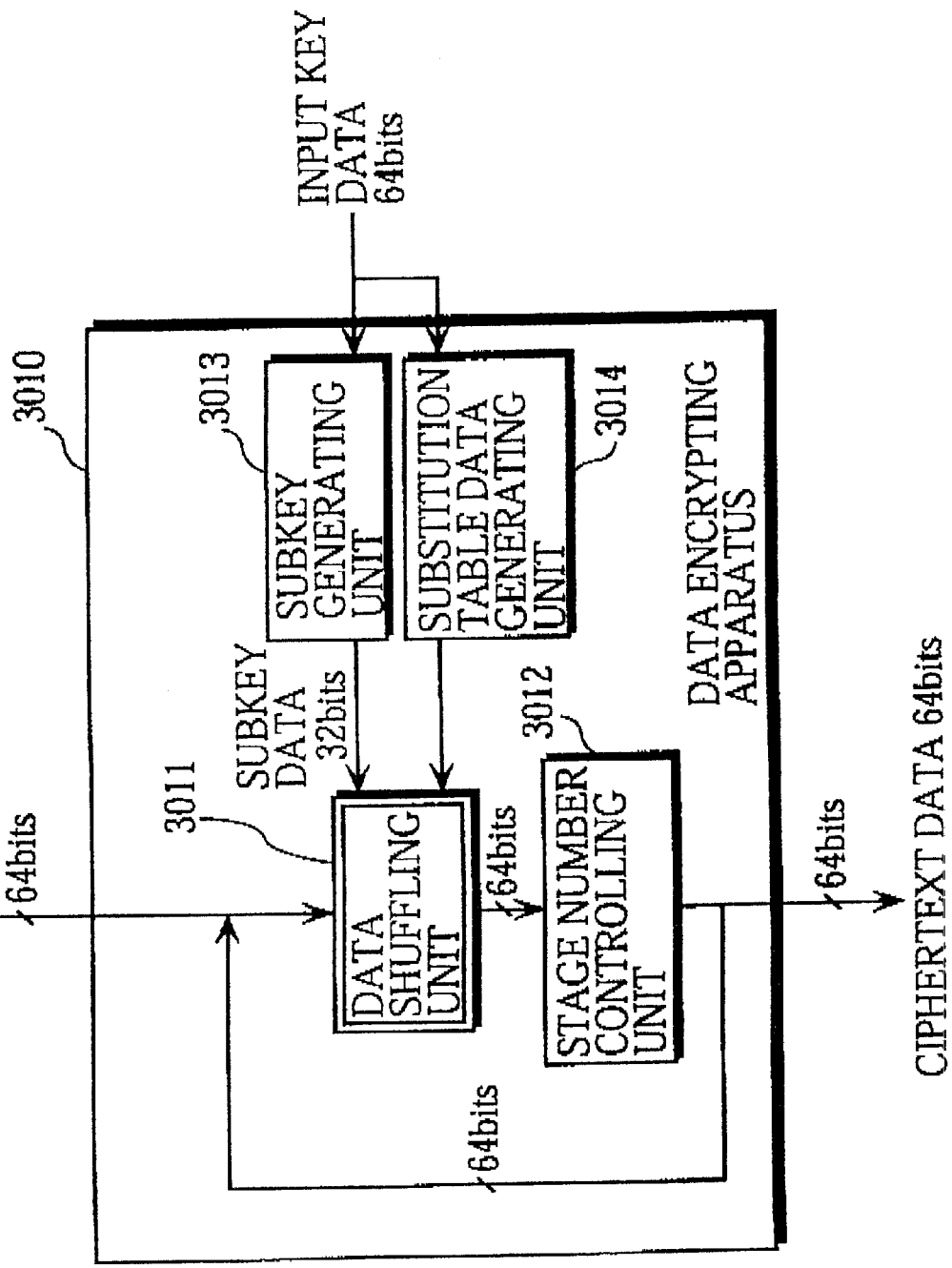
FIG. 1 shows the configuration of a data encrypting apparatus 3010 that uses the Blowfish cipher.
Figure 2:
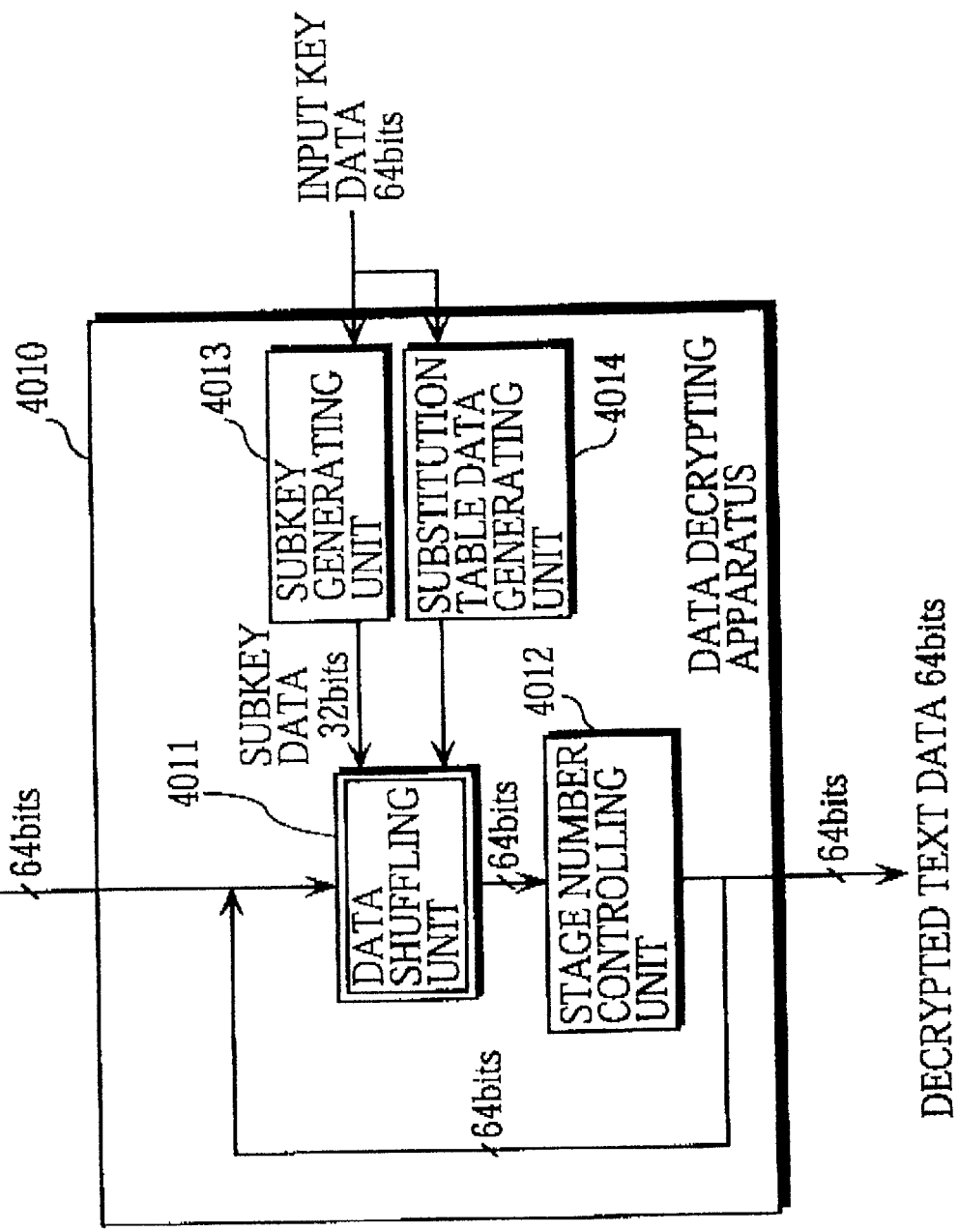
FIG. 2 shows the configuration of a data decrypting apparatus 4010 that uses the Blowfish cipher.
Figure 3:
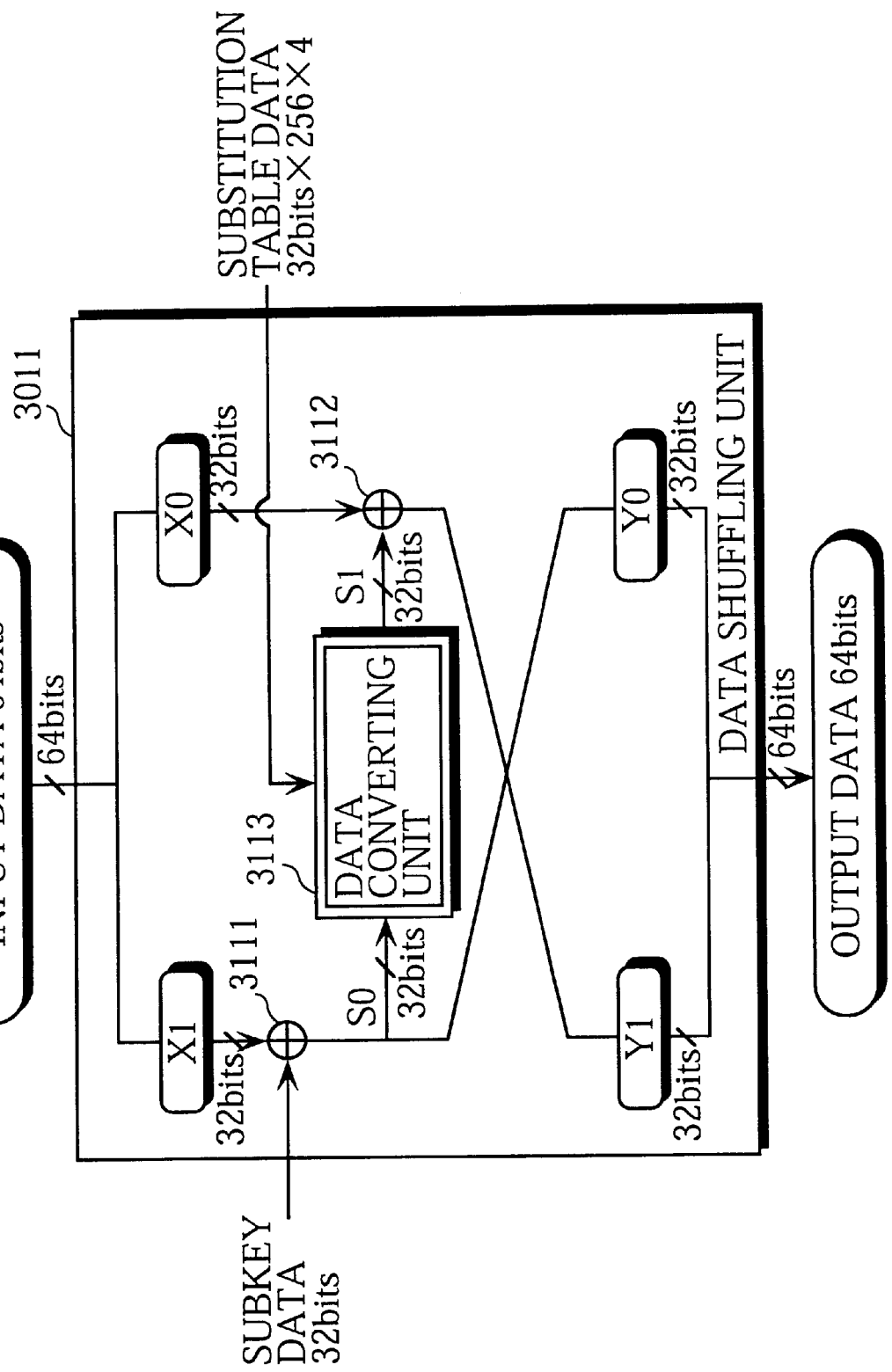
FIG. 3 shows the detailed construction of a data shuffling unit 3011 shown in FIG. 1.

This data shuffling unit 101 is roughly similar to the data shuffling unit 3011 shown in FIG. 3.

The first exclusive-OR operating unit 1011 is the same as the first exclusive-OR operating unit 3111 in FIG. 3.

The second exclusive-OR operating unit 1012 is the same as the second exclusive-OR operating unit 3112 in FIG. 3.

The data converting unit 300 converts 32-bit data S0 using the 8K-bit substitution table data and outputs 32-bit converted data S1.

Figure 10:
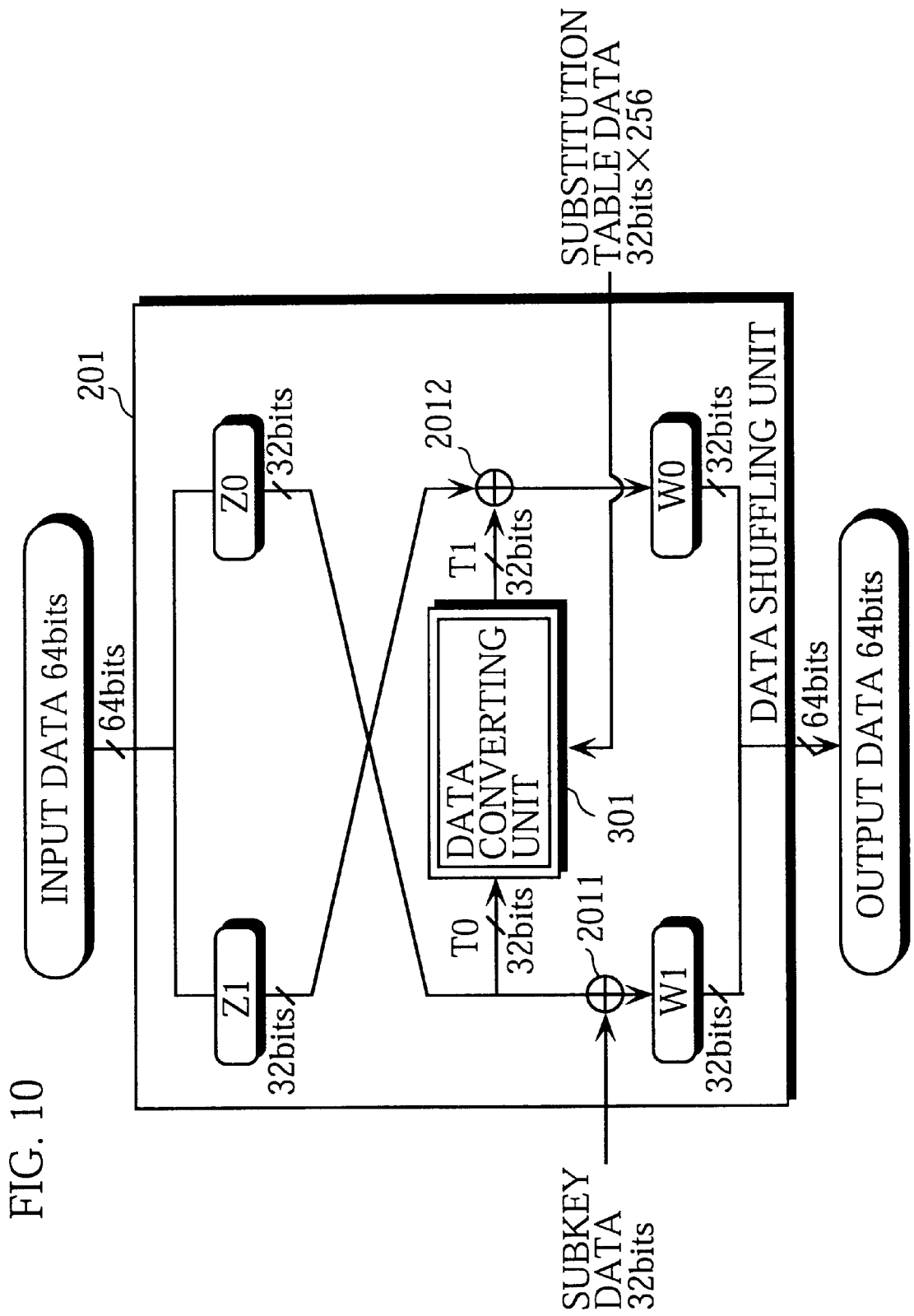
FIG. 10 shows the detailed construction of a data shuffling unit 201 shown in FIG. 8.

FIG. 10 shows the detailed construction of the data shuffling unit 201 shown in FIG. 8.

The data shuffling unit 201 includes a first exclusive-OR operating unit 2011, a second exclusive-OR operating unit 2012, and a data converting unit 301.

Figure 4:
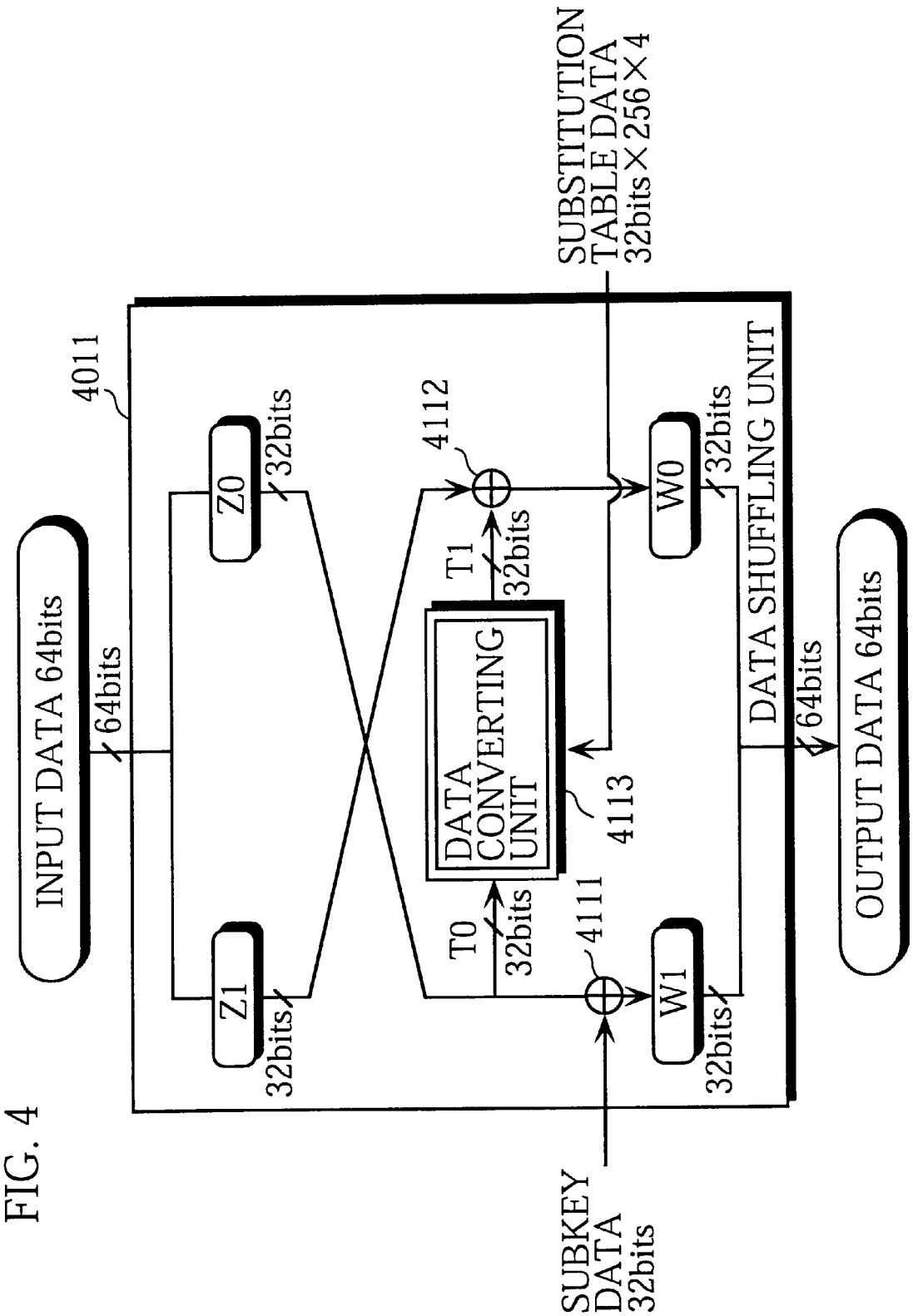
FIG. 4 shows the detailed construction of a data shuffling unit 4011 shown in FIG. 2.

This data shuffling unit 201 is roughly similar to the data shuffling unit 4011 shown in FIG. 4.

The first exclusive-OR operating unit 2011 is the same as the first exclusive-OR operating unit 4111 in FIG. 4.

The second exclusive-OR operating unit 2012 is the same as the second exclusive-OR operating unit 4112 in FIG. 4.

The data converting unit 301 is the same as the data converting unit 300 shown in FIG. 9.

Figure 11:
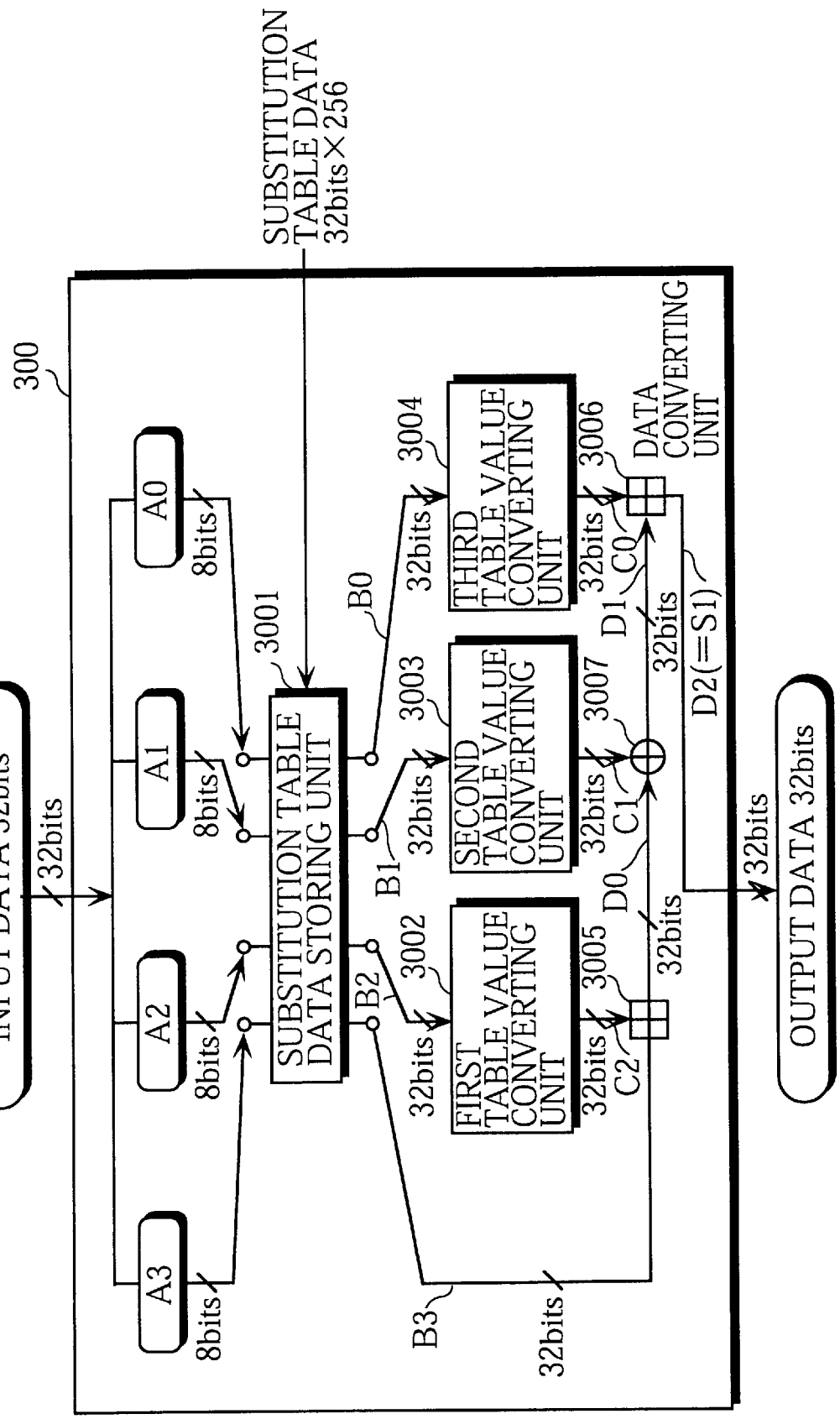
FIG. 11 shows the detailed construction of a data converting unit 300 shown in FIG. 9.

FIG. 11 shows the detailed construction of the data converting unit 300 shown in FIG. 9.

This data converting unit 300 includes a substitution table data storing unit 3001, a first table value converting unit 3002, a second table value converting unit 3003, a third table value converting unit 3004, a first adding unit 3005, a second adding unit 3006, and an exclusive-OR operating unit 3007.

32-bit input data S0 is divided from the highest-order bit into four sets of 8-bit data A3, A2, A1, and A0.

The substitution table data storing unit 3001 divides 8K-bit input substitution table data from the highest-order bit into 256 32-bit table values and stores the 256 table values. In this substitution table data storing unit 3001, the four sets of 8-bit data A3~A0 are inputted. The substitution table data storing unit 3001 specifies four table values out of the 256 stored table values based on A3~A0, and outputs the four table values specified for A3~A0 respectively as B3, B2, B1, and B0. In this specification, the 256 32-bit table values stored in the substitution table data storing unit 3001 are set as Tab[0], Tab[1], . . . , and Tab[255] in order of decreasing bits.

The first table value converting unit 3002 performs a cyclic 1-bit shift conversion on the 32-bit input table value B2 to higher-order bits and outputs 32-bit converted data C2.

The second table value converting unit 3003 performs a cyclic 2-bit shift conversion on the 32-bit input table value B1 to higher-order bits and outputs 32-bit converted data C1.

The third table value converting unit 3004 performs a cyclic 3-bit shift conversion on the 32-bit input table value B0 to higher-order bits and outputs 32-bit converted data C0.

The first adding unit 3005 performs an arithmetic addition on the 32-bit table value B3 outputted from the substitution table data storing unit 3001 and the 32-bit data C2 outputted from the first table value converting unit 3002 and outputs resultant lower-order 32-bit data D0, ignoring any carry beyond the 32nd bit.

This calculation is expressed as $$D0=(B3+C2) \bmod (2^{32})$$

The exclusive-OR operating unit 3007 performs an exclusive-OR operation for corresponding bits in the 32-bit data D0 and the 32-bit data C1 outputted from the second table value converting unit 3003, and outputs resultant 32-bit data D1.

This calculation is expressed as $$D1=D0(+)C1$$

The second adding unit 3006 performs an arithmetic addition on the 32-bit data D1 and the 32-bit data C0 outputted from the third table value converting unit 3004 and outputs resultant lower-order 32-bit data D2, ignoring any carry beyond the 32nd bit.

This calculation is expressed as $$D2=(D1+C0) \bmod (2^{32})$$

The 32-bit data D2 outputted from the second adding unit 3006 becomes 32-bit output data S1 of the data converting unit 300.

The operation of the data converting unit 300 will be described below.

(1) 8K-bit input substitution table data (256 32-bit table values) is stored in the substitution table data storing unit 3001.

(2) 32-bit input data S0 is divided from the highest-order bit into four sets of 8-bit data A3~A0.

(3) The substitution table data storing unit 3001 specifies four table values out of the 256 stored table values based on the four sets of 8-bit input data A3~A0 and outputs the four 32-bit table values respectively specified for A3~A0 as table values B3~B0.

(4) The first table value converting unit 3002 performs a cyclic 1-bit shift conversion on the table value B2 towards higher-order bits and outputs converted data C2. The second table value converting unit 3003 performs a cyclic 2-bit shift conversion on the table value B1 towards higher-order bits and outputs converted data C1. The third table value converting unit 3004 performs a cyclic 3-bit shift conversion on the table value B0 towards higher-order bits and outputs converted data C0.

(5) The first adding unit 3005 performs an arithmetic addition on the 32-bit table value B3 and the 32-bit converted data C2 and outputs resultant lower-order 32-bit data D0, ignoring any carry beyond the 32nd bit.

(6) The exclusive-OR operating unit 3007 performs an exclusive-OR operation for corresponding bits in the 32-bit data D0 and the 32-bit converted data C1 and outputs resultant 32-bit data D1.

(7) The second adding unit 3006 performs an arithmetic addition on the 32-bit data D1 and the 32-bit converted data C0 and outputs resultant lower-order 32-bit data D2 (=S1), ignoring any carry beyond the 32nd bit.

The security of a data cryptosystem that uses the above data shuffling unit 101 greatly depends on a data shuffling function of the conversion operations performed in the data converting unit 300. The data converting unit 300 retrieves four table values from one set of substitution table data in the substitution table data storing unit 3001 and performs cyclic bit shift conversions by different bit lengths on three of the four table values in the first to third table value converting units 3002~3004. Accordingly, a high level of security similar to cryptosystems that use four sets of substitution table data can be achieved with only one set of substitution table data.

Thus, the encrypted communication system of the first embodiment is highly secure against cryptanalysis and other unauthorized attacks.

The construction of the data converting unit 301 in FIG. 10 is similar to the data converting unit 300, so that its explanation is omitted here.

The following is an explanation on the principle behind encryption of plaintext data by the data shuffling unit 101 in FIG. 9 and recovery of the plaintext data by the data shuffling unit 201 in FIG. 10.

As described above, X1, X0, Y1, Y0, S0, and S1 in the data shuffling unit 101 in FIG. 9 have the following relationships:

$$S0=Ki(+)X1 \qquad \text{(Formula 4)}$$

$$S1=F(R,S0) \qquad \text{(Formula 5)}$$

$$Y1=S1(+)X0 \qquad \text{(Formula 6)}$$

$$Y0=S0 \qquad \text{(Formula 7)}$$

where "Ki" denotes 32-bit subkey data, "R" denotes 8K-bit substitution table data, and "(+)" denotes an exclusive-OR operation. Also, "F(R,α)" denotes output data of the data converting unit 300 where R is a table value and α is input data.

Meanwhile, Z1, Z0, W1, W0, and T1 in the data shuffling unit 201 in FIG. 10 have the following relationships:

$$T1 = F(R, Z0) \quad \text{(Formula 8)}$$

$$W1 = Ki(+)Z0 \quad \text{(Formula 9)}$$

$$W0 = T1(+)Z1 \quad \text{(Formula 10)}$$

Suppose output data of the data shuffling unit 101 is inputted in the data shuffling unit 201. That is, $$Y1 = Z1 \quad \text{(Formula 11)}$$

$$Y0 = Z0 \quad \text{(Formula 12)}$$

(1) According to Formulas 7 and 12, $$Y0 = Z0 = S0 \quad \text{(Formula 13)}$$

(2) According to Formula 13, Formula 9 is expressed as $$W1 = Ki(+)S0 \quad \text{(Formula 14)}$$

(3) Here, an exclusive-OR has the following property:

$$\beta(+)\{(\beta(+)\gamma\} = \gamma \quad \text{(Formula 15)}$$

When Formula 4 is substituted into Formula 14, the result can be expressed using Formula 15 as $$W1 = Ki(+)\{Ki(+)X1\} = X1 \quad \text{(Formula 16)}$$

(4) According to Formulas 8 and 13, $$T1 = F(R, S0) \quad \text{(Formula 17)}$$

(5) According to Formulas 5 and 17, $$S1 = T1 \quad \text{(Formula 18)}$$

(6) Formula 10 is expressed using Formulas 11 and 18 as $$W0 = S1(+)Y1 \quad \text{(Formula 19)}$$

(7) When Formula 6 is substituted into Formula 19, the result can be expressed using Formula 15 as $$W0 = S1(+)\{S1(+)X0\} = X0 \quad \text{(Formula 20)}$$

From Formulas 16 and 20, it is clear that plaintext data encrypted by the data shuffling unit 101 is recovered by the data shuffling unit 201.

Next, the principle behind encryption of plaintext data by the data encrypting apparatus 10 in FIG. 7 and recovery of the plaintext data by the data decrypting apparatus 20 in FIG. 8.

First, the data encrypting apparatus 10 encrypts plaintext block A to generate ciphertext block A using 256-bit key data K and 8K-bit substitution table data R, as follows.

The key controlling unit 103 inputs 32-bit subkey data K0~K7 in the data shuffling unit 101 one by one. Meanwhile, the substitution table data R is repeatedly used during encryption of plaintext block A.

The data shuffling unit 101 performs data shuffling on plaintext block A using subkey data K0 and the substitution table data R to generate intermediate block A1. The data shuffling unit 101 then performs data shuffling on intermediate block A1 using subkey data K1 and the substitution table data R to generate intermediate block A2.

In the same way, the data shuffling unit 101 performs data shuffling on intermediate blocks A2~A6 respectively using subkey data K2~K7 through use of the substitution table data R. Consequently, ciphertext block A is generated.

On the other hand, the data decrypting apparatus 20 decrypts ciphertext block A to generate decrypted text block A (plaintext block A) using the same 256-bit key data K and substitution table data R as the data encrypting apparatus 10, as follows.

The key controlling unit 203 inputs 32-bit subkey data K7~K0 in the data shuffling unit 201 one by one. Meanwhile, the substitution table data R is repeatedly used during decryption of ciphertext block A.

The data shuffling unit 201 performs data shuffling on ciphertext block A using subkey data K7 and the substitution table data R to generate intermediate block A6. The data shuffling unit 201 then performs data shuffling on intermediate block A6 using subkey data K6 and the substitution table data R to generate intermediate block A5.

In the same way, the data shuffling unit 201 performs data shuffling on intermediate blocks A5~A1 respectively using subkey data K5~K0 through use of the substitution table data R. Consequently, decrypted text block A is generated.

It is thus proved that plaintext data encrypted by the data encrypting apparatus 10 is recovered by the data decrypting apparatus 20.

The security of the data encrypting apparatus 10 will be explained below.

When compared with the conventional data converting unit 3113 in FIG. 5, the data converting unit 300 in FIG. 11 includes the first to third table value converting unit 3002~3004. With this construction, despite storing only one set of substitution table data, the data converting unit 300 virtually achieves the same effect as the data converting unit 3113 which stores four sets of substitution table data. For example, B2=B3 when A2=A3 in FIG. 11, since the same substitution table data is used for A2 and A3. However, B2 is converted into C2 by the first table value converting unit 3002, so that the first adding unit 3005 will not perform an arithmetic addition on two equal values. Such a cryptosystem can maintain a high data shuffling function and thus is secure against unauthorized attacks.

Accordingly, a cryptographic processing apparatus with the above data converting unit 300 can reduce the amount of substitution table data to ¼ of a conventional cryptographic processing apparatus with the data converting unit 3113, without impairing cryptographic security.

Hence the present invention simplifies hardware and software implementations by substantially reducing the size of stored data while maintaining high cryptographic security, in a block cipher such as the Blowfish cipher that uses substitution table data.

Second Embodiment

A cryptographic processing apparatus of the second embodiment of the present invention retrieves one table value from one set of substitution table data and performs different fixed conversions, such as rotations by different bit lengths and additions of different constants, on the retrieved table value, to generate a plurality of output values. By doing so, the cryptographic processing apparatus achieves cryptographic processing where the amount of substitution table data is reduced without loss of security.

In the second embodiment, the data converting unit 300 and data converting unit 301 in the first embodiment shown in FIGS. 9 and 10 have been replaced with a data converting unit 500 and a data converting unit 501. Also, the amount of substitution table data used in the first embodiment has been reduced to ¼ (2K bits) in the second embodiment.

Figure 12:
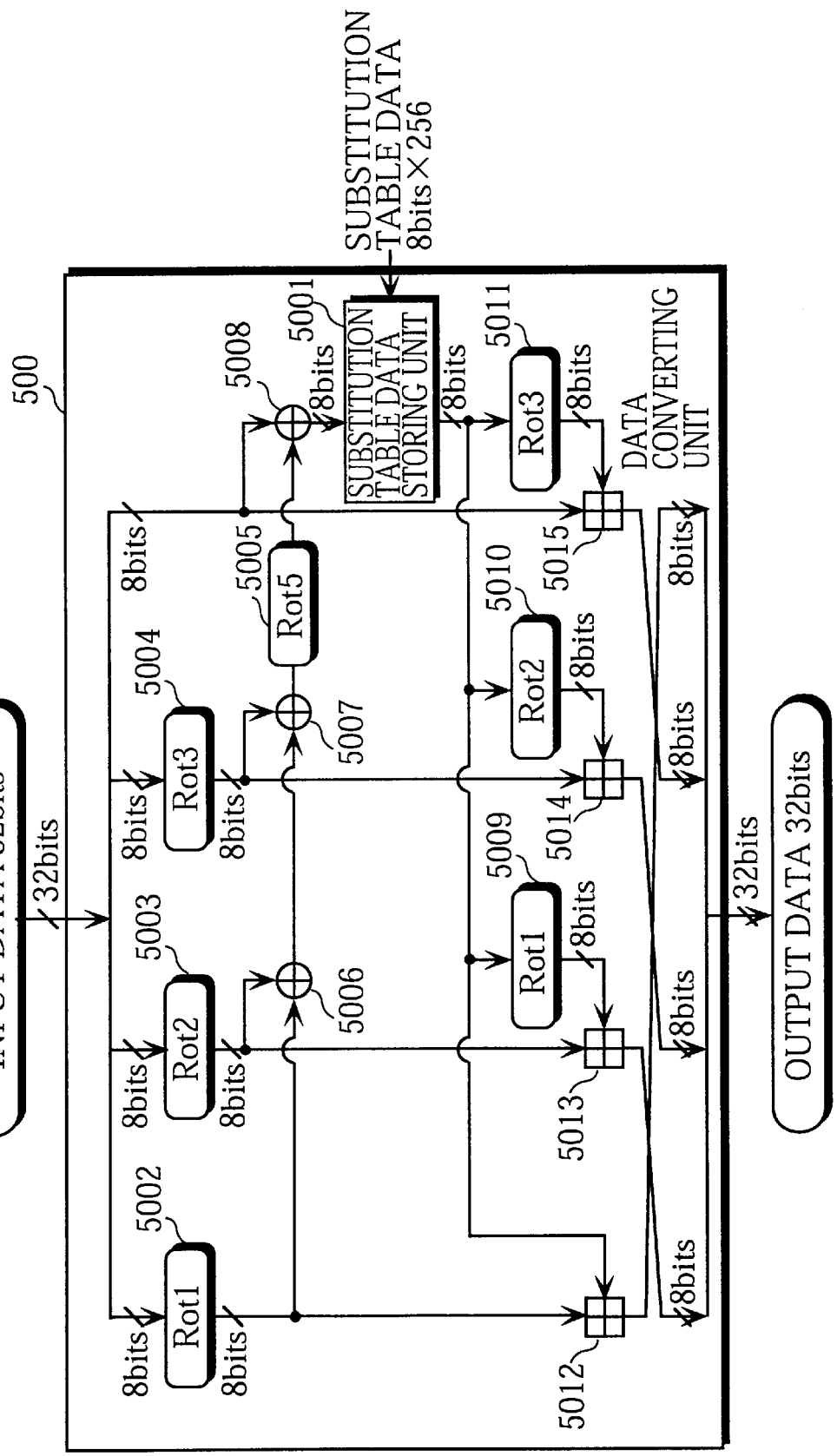
FIG. 12 shows the detailed construction of a data converting unit 500 in the second embodiment of the present invention.

FIG. 12 shows the detailed construction of the data converting unit 500 of the second embodiment.

This data converting unit 500 includes a substitution table data storing unit 5001, a first input converting unit 5002, a second input converting unit 5003, a third input converting unit 5004, a fourth input converting unit 5005, a first exclusive-OR operating unit 5006, a second exclusive-OR operating unit 5007, a third exclusive-OR operating unit 5008, a first table value converting unit 5009, a second table value converting unit 5010, a third table value converting unit 5011, a first table value adding unit 5012, a second table value adding unit 5013, a third table value adding unit 5014, and a fourth table value adding unit 5015.

32-bit data S0 inputted in the data converting unit 500 is divided from the highest-order bit into four sets of 8-bit data E3, E2, E1, and E0.

The first input converting unit 5002 performs a cyclic 1-bit shift conversion on the 8-bit data E3 towards higher-order bits and outputs 8-bit converted data F3.

The second input converting unit 5003 performs a cyclic 2-bit shift conversion on the 8-bit data E2 towards higher-order bits and outputs 8-bit converted data F2.

The third input converting unit 5004 performs a cyclic 3-bit shift conversion on the 8-bit data E1 towards higher-order bits and outputs 8-bit converted data F1.

The first exclusive-OR operating unit 5006 finds an exclusive-OR for corresponding bits in the converted data F3 outputted from the first input converting unit 5002 and the converted data F2 outputted from the second input converting unit 5003, and outputs resultant 8-bit data G2.

The second exclusive-OR operating unit 5007 finds an exclusive-OR for corresponding bits in the data G2 outputted from the first exclusive-OR operating unit 5006 and the converted data F1 outputted from the third input converting unit 5004, and outputs resultant 8-bit data G1.

The fourth input converting unit 5005 performs a cyclic 5-bit shift conversion on the data G1 outputted from the second exclusive-OR operating unit 5007 towards higher-order bits, and outputs 8-bit converted data F0.

The third exclusive-OR operating unit 5008 finds an exclusive-OR for corresponding bits in the 8-bit data E0 and the 8-bit converted data F0 outputted from the fourth input converting unit 5005 and outputs resultant 8-bit data G0.

The substitution table data storing unit 5001 divides 2K-bit input substitution table data from the highest-order bit into 256 table values which are each 8 bits long, and stores the 256 table values. Based on the data G0 outputted from the third exclusive-OR operating unit 5008, the substitution table data storing unit 5001 specifies one of the 256 stored table values and outputs the specified table value as H0.

The first table value converting unit 5009 performs a cyclic 1-bit shift conversion on the 8-bit table value H0 outputted from the substitution table data storing unit 5001 towards higher-order bits and outputs 8-bit converted data I2.

The second table value converting unit 5010 performs a cyclic 2-bit shift conversion on the 8-bit table value H0 towards higher-order bits and outputs 8-bit converted data I1.

The third table value converting unit 5011 performs a cyclic. 3-bit shift conversion on the 8-bit table value H0 towards higher-order bits and outputs 8-bit converted data I0.

The first adding unit 5012 performs an arithmetic addition on the 8-bit converted data F3 outputted from the first input converting unit 5002 and the 8-bit table value H0 outputted from the substitution table data storing unit 5001 and outputs resultant lower-order 8-bit data J0, ignoring any carry beyond the 8th bit.

This calculation is expressed as $J0=(F3+H0) \mod (2^8)$

The second adding unit 5013 performs an arithmetic addition on the 8-bit converted data F2 outputted from the second input converting unit 5003 and the 8-bit converted data I2 outputted from the first table value converting unit 5009 and outputs resultant lower-order 8-bit data J3, ignoring any carry beyond the 8th bit.

This calculation is expressed as $J3=(F2+I2) \mod (2^8)$

The third adding unit 5014 performs an arithmetic addition on the 8-bit converted data F1 outputted from the third input converting unit 5004 and the 8-bit converted data I1 outputted from the second table value converting unit 5010 and outputs resultant lower-order 8-bit data J2, ignoring any carry beyond the 8th bit.

This calculation is expressed as $J2=(F1+I1) \mod (2^8)$

The fourth adding unit 5015 performs an arithmetic addition on the 8-bit data E0 and the 8-bit converted data I0 outputted from the third table value converting unit 5011 and outputs resultant lower-order 8-bit data J1, ignoring any carry beyond the 8th bit.

This calculation is expressed as $J1=(E0+I0) \mod 2^8)$

The output data J3 of the second adding unit 5013, the output data J2 of the third adding unit 5014, the output data J1 of the fourth adding unit 5015, and the output data J0 of the first adding unit 5012 are combined in this order to form 32-bit output data S1 of the data converting unit 500.

The data converting unit 500 with the above construction operates as follows.

(1) 2K-bit input substitution table data 256 8-bit table values) is stored in the substitution table data storing unit 5001.

(2) 32-bit input data S0 is divided from the highest-order bit into four sets of 8-bit data E3~E0.

(3) The first input converting unit 5002, the second input converting unit 5003, the third input converting unit 5004, the fourth input converting unit 5005, the first exclusive-OR operating unit 5006, the second exclusive-OR operating unit 5007, and the third exclusive-OR operating unit 5008 perform respective bit operations for E3~E0. As a result, 8-bit data G0 is generated.

(4) The substitution table data storing unit 5001 specifies one of the 256 table values based on the data G0 and outputs the specified table value as H0.

(5) The first table value converting unit 5009 performs a cyclic 1-bit shift conversion on the table value H0 towards higher-order bits and outputs converted data I2. The second table value converting unit 5010 performs a cyclic 2-bit shift conversion on the table value H0 towards higher-order bits and outputs converted data I1. The third table value converting unit 5011 performs a cyclic 3-bit shift conversion on the table value H0 towards higher-order bits and outputs converted data I0.

(6) The second adding unit 5013 performs an arithmetic addition on the converted data I2 and converted data F2 outputted from the second input converting unit 5003 and outputs resultant lower-order 8-bit data J3, ignoring any carry beyond the 8th bit.

The third adding unit 5014 performs an arithmetic addition on the converted data I1 and converted data F1 outputted from the third input converting unit 5004 and outputs resultant lower-order 8-bit data J2, ignoring any carry beyond the 8th bit. The fourth adding unit 5015 performs an arithmetic addition on the converted data I0 and the 8-bit data E0 and outputs resultant lower-order 8-bit data J1, ignoring any carry beyond the 8th bit. The first adding unit 5012 performs an arithmetic addition on the table value H0 and converted data F3 outputted from the first input converting unit 5002 and outputs resultant lower-order 8-bit data J0, ignoring any carry beyond the 8th bit.

(7) The 8-bit data J3, J2, J1, and J0 are combined in this order to form 32-bit output data S1 of the data converting unit 500.

The security of a data cryptosystem that uses the above data shuffling unit 101 of the second embodiment greatly depends on a data shuffling function of the conversion operations performed in the data converting unit 500. The data converting unit 500 retrieves one table value from a set of substitution table data stored in the substitution table data storing unit 5001, generates three converted values from the retrieved table value by performing cyclic bit shift conversions on the table value in the first to third table value converting units 5009~5011, and creates output data using the table value and the three converted values. Accordingly, while using only one set of substitution table data, the above cryptosystem can maintain a level of security similar to a cryptosystem that uses four sets of substitution table data.

Thus, the encrypted communication system of the second embodiment is highly secure against cryptanalysis and other unauthorized attacks.

The construction of the data converting unit 501 of the second embodiment is similar to the data converting unit 500, so that its explanation is omitted here.

Note that each component of the data encrypting apparatus 10 and data decrypting apparatus 20 in the first and second embodiments can be implemented not only by dedicated hardware with logic circuitry such as exclusive-OR, but can also be implemented by software on a computer system made up of a general-purpose microprocessor, a control program, a ROM storing substitution table data, and a RAM as a work area.

In the first and second embodiments, the exclusive-OR operating units 1011, 1012, 2011, and 2012 have been used for merging 32-bit subkey data and 32-bit input data and merging 32-bit data and 32-bit data. However, other devices, such as a full adder with carry, which are capable of reversible operations can be used instead of the exclusive-OR operating units. Note here that in the above embodiments operations by the first exclusive-OR operating unit 2011 and the second exclusive-OR operating unit 2012 need to be the reverse of operations by the first exclusive-OR operating unit 1011 and the second exclusive-OR operating unit 1012, respectively. Also, it is desirable to use simple operations to avoid a decrease in processing speed.

In the data encrypting apparatus 10 and data decrypting apparatus 20 of the above embodiments, the number of times data shuffling is to be performed by the data shuffling unit 101 or 201 for one input data block has been set at 8. However, the present invention is not limited to such. If the frequency of data shuffling for one input data block is set smaller than 8, key data smaller than 256 bits will be inputted in the data encrypting apparatus 10 and data decrypting apparatus 20. On the other hand, if the frequency of data shuffling for one input data block is set greater than 8, key data larger than 256 bits will be inputted in the data encrypting apparatus 10 and data decrypting apparatus 20. It is also possible to increase the frequency of data shuffling without increasing the size of input key data, by repeatedly using the same subkey data of 256-bit key data. For key data smaller than 256 bits, subkey data may be generated using, for example, subkey generating means of DES or FEAL.

In the first to third table value converting units 3002~3004 in the data converting units 300 and 301, the first to fourth input converting units 5002~5005 in the data converting units 500 and 501, and the first to third table value converting units 5009~5011 in the data converting units 500 and 501, the lengths of bits to be shifted towards higher-order bits are not limited to those used in the above embodiments, as long as converting units which process the same data differ in shift bit length. Also, if shift bit lengths are determined based on subkey data, a more efficient data shuffling function can be attained. For instance, one of the values 0~31 represented by the 0~4th bits of 32-bit subkey data may be set as the shift bit length of the first table value converting unit 3002, one of the values 0~31 represented by the 8~12th bits of the 32-bit subkey data may be set as the shift bit length of the second table value converting unit 3003, and one of the values 0~31 represented by the 16~20th bits of the 32-bit subkey data may be set as the shift bit length of the third table value converting unit 3004.

Also, in the first to third table value converting units 3002~3004 in the data converting units 300 and 301 and the first to third table value converting units 5009~5011 in the data converting units 500 and 501, conversions which are different with those used in the first and second embodiments may be used, as long as one output value is specified from one input value. Which is to say, one-way conversions where the input pre-converted value cannot be recovered from the output converted value may be used. Note that conversions performed respectively by table value converting units included in one data converting unit should be different with each other. Also, it is desirable to use simple operations to avoid a decrease in processing speed.

While each exclusive-OR operating unit and data converting unit in the first and second embodiments has performed a data conversion in units of 8 or 32 bits, different bit lengths may instead be used. For instance, when implementing the present invention through a general-purpose 64-bit CPU, data conversions may be performed in units of 64 bits. It is also possible to convert only one half of input data (such as the lower-order 16 bits of 32-bit input data), with it being possible to reduce processing time.

In the first and second embodiments, three converted values obtained as a result of different fixed conversions by three table value converting units and one non-converted table value have been used as substitutes for four table values obtained using four substitution table data storing units. Instead, four table value converting units may be used to perform respective four different fixed conversions to generate four converted values as the substitutes for the four table values. Here, the four different fixed conversions performed by the four table value converting units may include a non-conversion. When one of the four different fixed conversions is a non-conversion, the overall result will be the same as the case where three table value converting units are used. The non-conversion referred to here is, for example, a cyclic 0-bit shift conversion when the four table value converting units perform cyclic bit shift conversions by different bit lengths, or an addition of 0 when the four table value converting units perform additions of different constants. That is, modifications concerning table value converting units are possible, as long as four different values are obtained from one table value or from four table values which may not necessarily be different from one another.

Also, as the substitutes for four table values obtained using four substitution table data storing units, four values have been generated using three or four table value converting units in the above embodiments, although the present invention is not limited to such numbers.

Third Embodiment

A cryptographic processing apparatus of the third embodiment of the present invention renews input key data by converting actual key data using an immediately preceding ciphertext block, without renewing substitution table data. By doing so, the cryptographic processing apparatus achieves high-speed processing without loss of security, since the frequency of generation of substitution table data is reduced while input key data is renewed for cryptographic processing of each input block.

Figure 13:
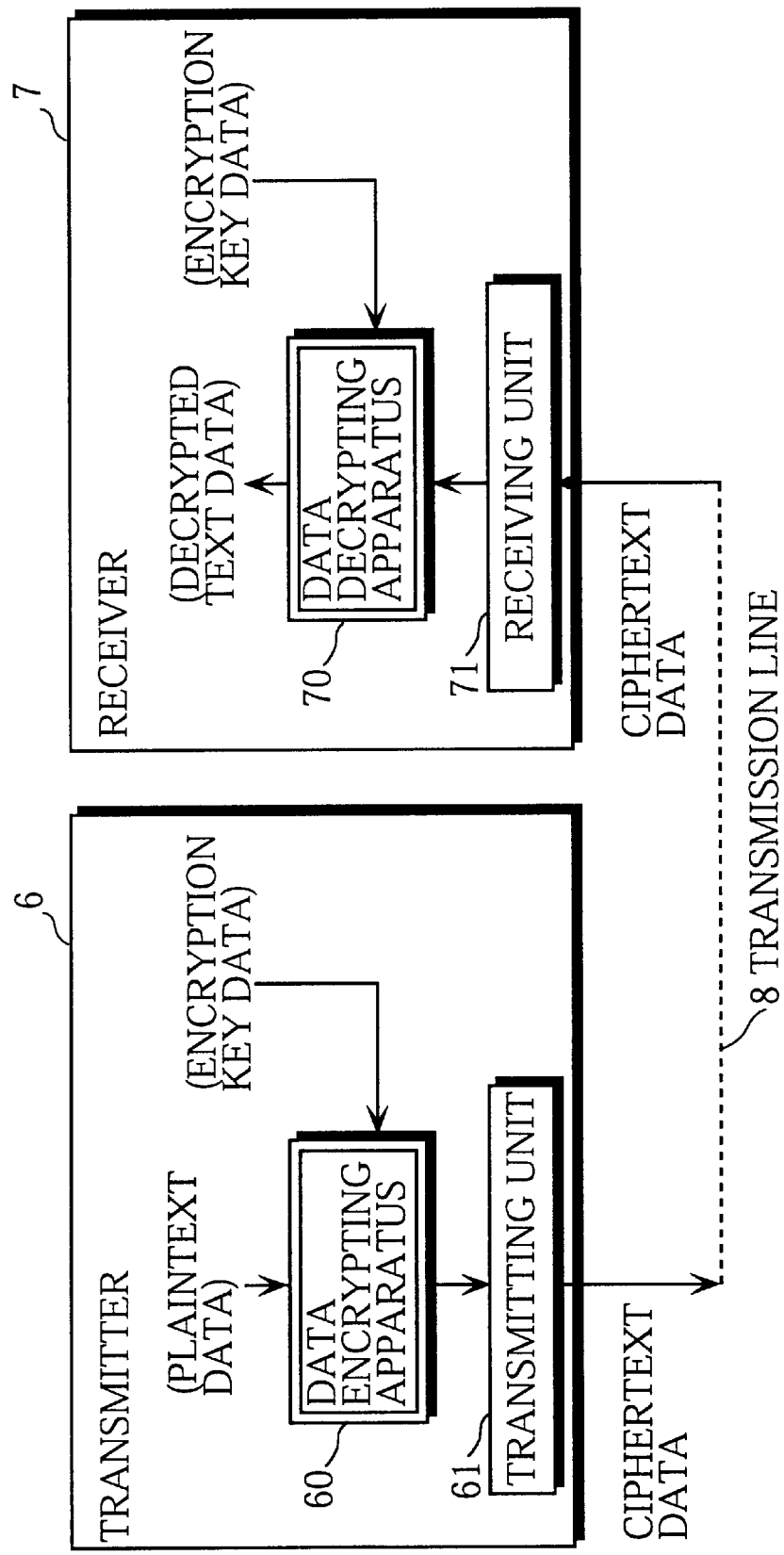
FIG. 13 shows the configuration of an encrypted communication system of the third embodiment of the present invention.

FIG. 13 shows the configuration of an encrypted communication system of the third embodiment of the present invention.

This encrypted communication system includes a transmitter 6 and a receiver 7.

The transmitter 6 is equipped with a data encrypting apparatus 60 and a transmitting unit 61.

The data encrypting apparatus 60 encrypts plaintext data in units of 64 bits using 640-bit encryption key data to generate ciphertext data. Here, the plaintext data is, for instance, digitally-coded audio or image information, while the same 640-bit encryption key data is held in secrecy by the transmitter 6 and the receiver 7 beforehand.

The transmitting unit 61 performs parallel-to-serial conversion, modulation, and amplification on the ciphertext data generated by the data encrypting apparatus 60 and outputs obtained transmission signals onto a transmission line 8.

The receiver 7 is equipped with a data decrypting apparatus 70 and a receiving unit 71.

The receiving unit 71 receives the transmission signals from the transmitting unit 61 via the transmission line 8 and performs the reverse process of the transmitting unit 61 on the transmission signals to recover the ciphertext data.

The data decrypting apparatus 70 decrypts the ciphertext data in units of 64 bits using the 640-bit encryption key data to obtain decrypted text data (original plaintext data).

This decrypted text data is, for instance, digitally-coded audio or image information, which is then decoded by a dedicated decoder (not illustrated) and reproduced via a speaker or a display.

Figure 14:
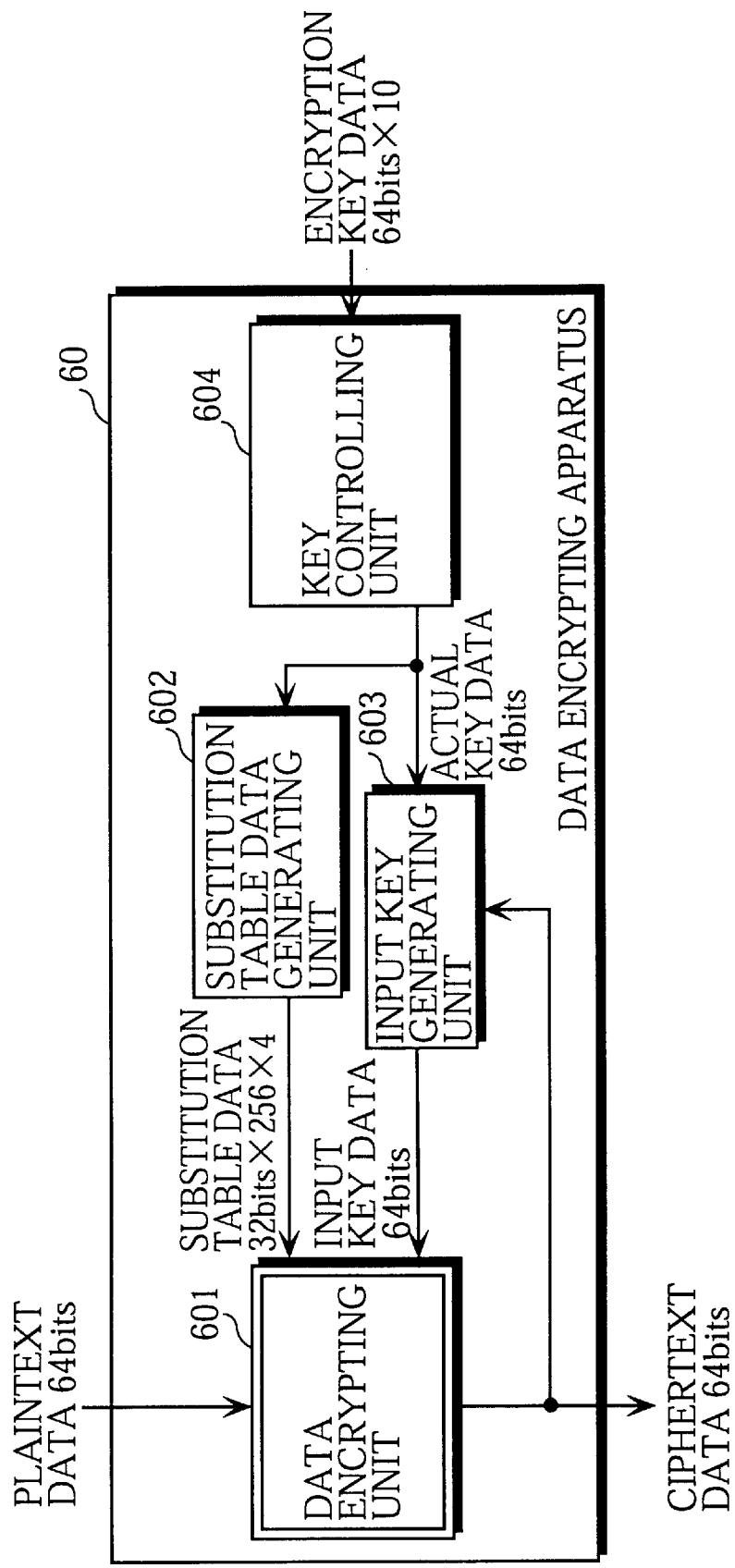
FIG. 14 shows the detailed construction of a data encrypting apparatus 60 shown in FIG. 13.

FIG. 14 shows the detailed construction of the data encrypting apparatus 60 shown in FIG. 13.

This data encrypting apparatus 60 includes a data encrypting unit 601, a substitution table data generating unit 602, an input key generating unit 603, and a key controlling unit 604.

The key controlling unit 604 divides the 640-bit encryption key data from the highest-order bit into 10 sets of 64-bit actual key data K[0]~K[9]. Whenever 1024 plaintext blocks are to be encrypted, the key controlling unit 604 outputs K[0]~K[9] one at a time to the substitution table data generating unit 602 and the input key generating unit 603. After actual key data K[9], actual key data K[0] is outputted again.

The substitution table data generating unit 602 generates 32K-bit substitution table data (1024 table values which are each 32 bits long) based on the substitution table data generating algorithm used in the Blowfish cipher, when receiving 64-bit actual key data from the key controlling unit 604. The substitution table data generating unit 602 then outputs the generated substitution table data to the data encrypting unit 601.

The input key generating unit 603 stores 64-bit actual key data received from the key controlling unit 604. Each time a ciphertext block is generated by the data encrypting unit 601, the input key generating unit 603 performs an exclusive-OR operation for corresponding bits in the ciphertext block and the stored 64-bit actual key data and outputs the result to the data encrypting unit 601 as input key data for encryption of the next plaintext block. Since there is no ciphertext block when the first plaintext block is to be encrypted, the input key generating unit 603 finds an exclusive-OR for corresponding bits in a 64-bit initial value IV (hereinafter, "initial block IV") and the actual key data and outputs the calculation result to the data encrypting unit 601 as input key data for encrypting the first plaintext block. This 64-bit initial block IV has been stored in the input key generating unit 603 in advance.

Here, once 32 ciphertext blocks have been generated, the input key generating unit 603 may, for example, perform an exclusive-OR operation for corresponding bits in the stored actual key data and the initial block IV instead of the most recently generated ciphertext block. In this case, the object whose exclusive-OR with the actual key data is to be calculated is initialized each time 32 plaintext blocks are encrypted.

The data encrypting unit 601 encrypts plaintext data in units of 64 bits using 64-bit input key data and 32K-bit substitution table data to generate ciphertext data. Also, the data encrypting unit 601 renews the substitution table data when receiving new 32K-bit substitution table data from the substitution table data generating unit 602.

Figure 15:
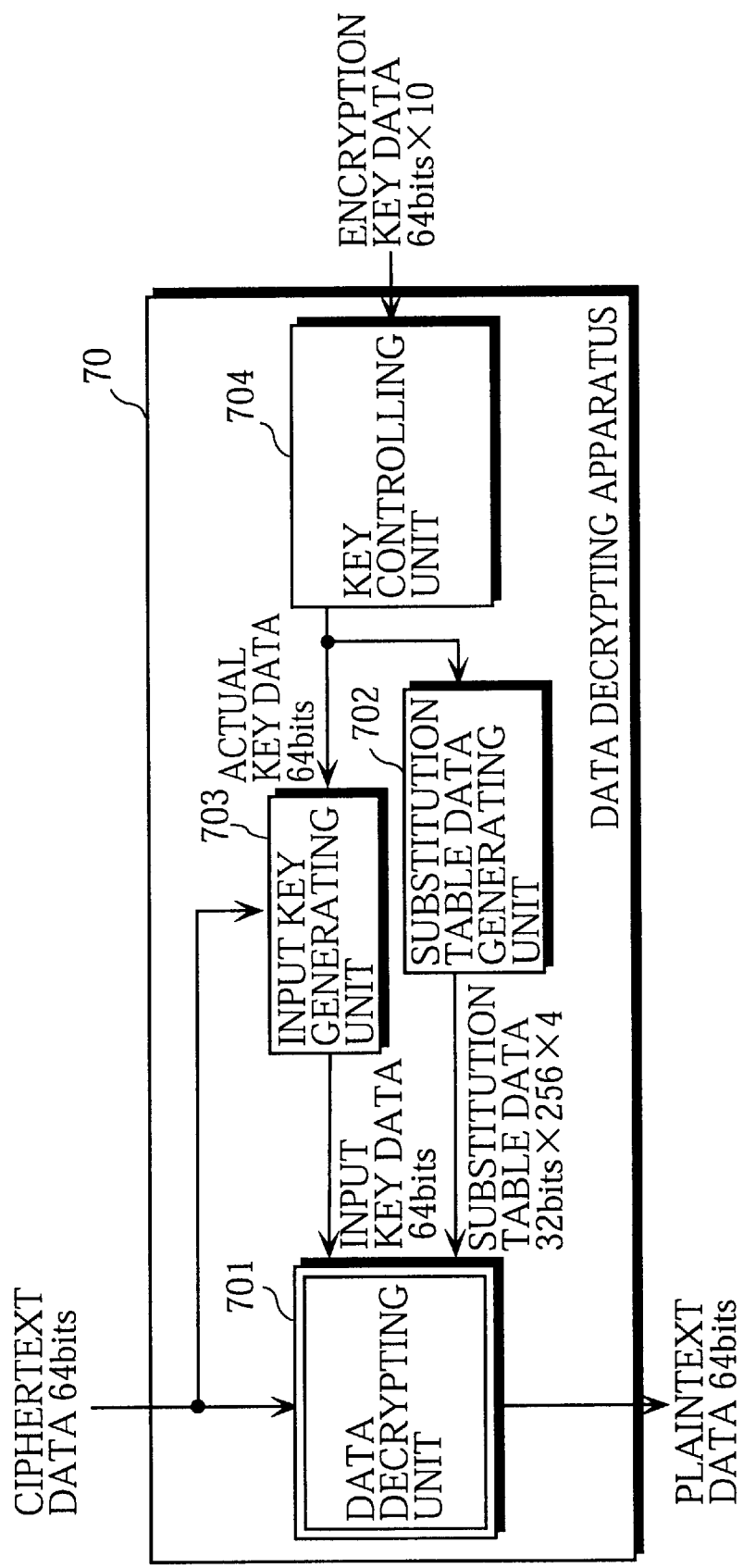
FIG. 15 shows the detailed construction of a data decrypting apparatus 70 shown in FIG. 13.

FIG. 15 shows the detailed construction of the data decrypting apparatus 70 shown in FIG. 13.

This data decrypting apparatus 70 includes a data decrypting unit 701, a substitution table data generating unit 702, an input key generating unit 703, and a key controlling unit 704.

The key controlling unit 704 divides the 640-bit encryption key data from the highest-order bit into 10 sets of 64-bit actual key data K[0]~K[9]. Whenever 1024 ciphertext blocks are to be decrypted, the key controlling unit 704 outputs K[0]~K[9] one at a time to the substitution table data generating unit 702 and the input key generating unit 703. After actual key data K[9], actual key data K[0] is outputted again.

The substitution table data generating unit 702 generates 32K-bit substitution table data using the substitution table data generating algorithm used in the Blowfish cipher, when receiving 64-bit actual key data from the key controlling unit 704. The substitution table data generating unit 702 then outputs the generated substitution table data to the data decrypting unit 701.

The input key generating unit 703 stores 64-bit actual key data received from the key controlling unit 704. Each time a plaintext block is generated by the data decrypting unit 701, the input key generating unit 703 performs an exclusive-OR operation for corresponding bits in a ciphertext block corresponding to the plaintext block and the stored 64-bit actual key data and outputs the result to the data decrypting unit 701 as input key data for decryption of the next ciphertext block. Here, there is no ciphertext block when the first ciphertext block is to be decrypted, so that the input key generating unit 703 finds an exclusive-OR for corresponding bits in the initial block IV and the actual key data and outputs the calculation result to the data decrypting unit 701 as input key data for decrypting the first ciphertext block. This 64-bit initial block IV has been stored in the input key generating unit 703 in advance.

Here, once 32 plaintext blocks have been generated, the input key generating unit 703 may, for example, perform an exclusive-OR operation for corresponding bits in the stored actual key data and the initial block IV instead of the most recently processed ciphertext block. In this case, the object whose exclusive-OR with the actual key data is to be calculated is initialized each time 32 ciphertext blocks are decrypted.

The data decrypting unit 701 decrypts ciphertext data in units of 64 bits using 64-bit input key data and 32K-bit substitution table data to generate plaintext data. Also, the data decrypting unit 701 renews the substitution table data when receiving new 32K-bit substitution table data from the substitution table data generating unit 702.

Figure 16:
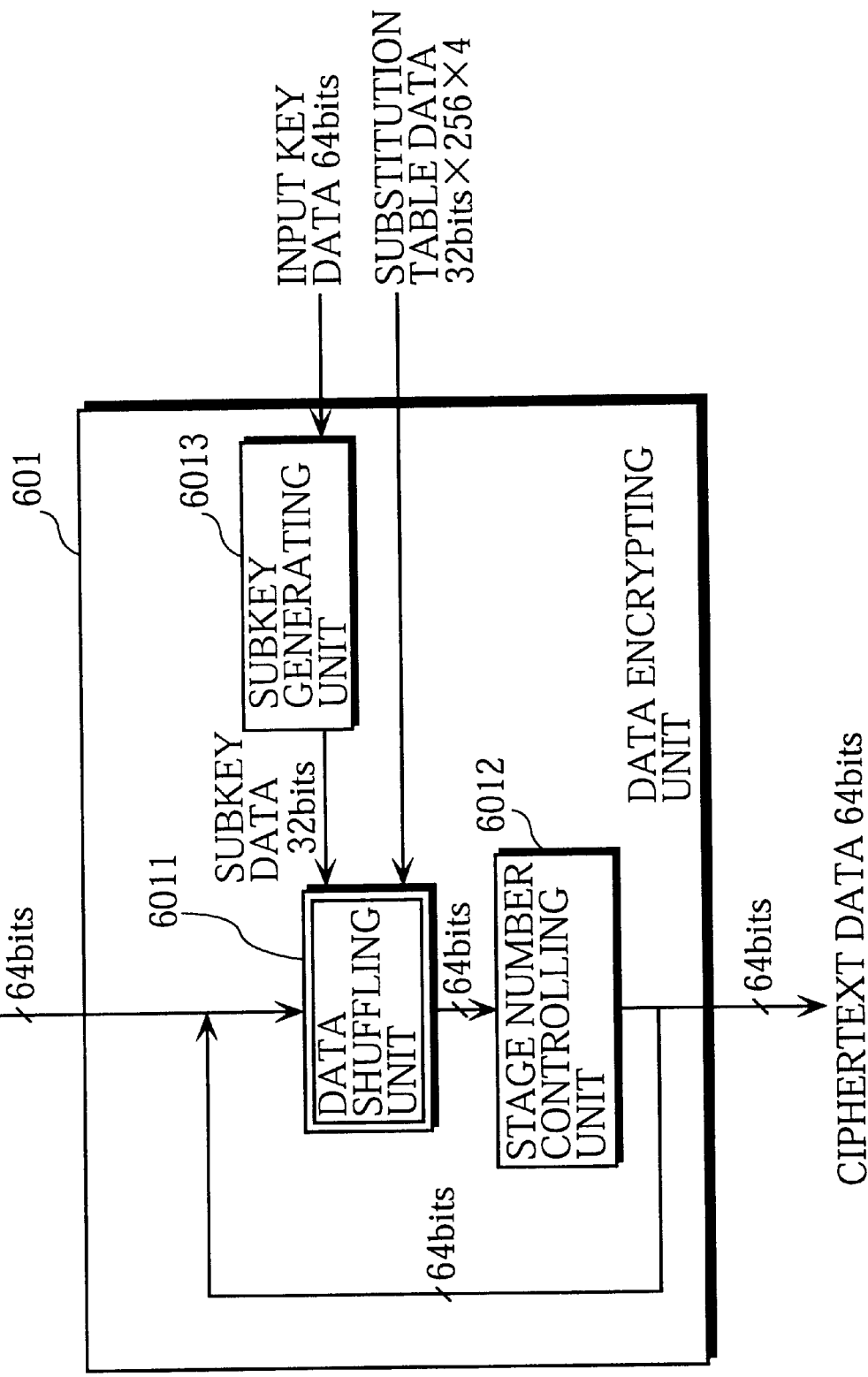
FIG. 16 shows the detailed construction of a data encrypting unit 601 shown in FIG. 14.

FIG. 16 shows the detailed construction of the data encrypting unit 601 shown in FIG. 14.

This data encrypting unit 601 is roughly made up of a data shuffling unit 6011, a stage number controlling unit 6012, and a subkey generating unit 6013.

The subkey generating unit 6013 generates 256-bit data from 64-bit input key data according to the subkey generating algorithm used in the Blowfish cipher, divides the 256-bit data into eight sets of 32-bit subkey data SK0~SK7, and stores SK0~SK7.

The data shuffling unit 6011 performs data shuffling for 64-bit input plaintext data using 32K-bit substitution table data and 32-bit subkey data generated by the subkey generating unit 6013, and outputs obtained 64-bit data.

The stage number controlling unit 6012 controls the number of times data shuffling is performed by the data shuffling unit 6011 to generate a ciphertext block from a plaintext block. The stage number controlling unit 6012 counts the number of times data shuffling is performed for each plaintext block. If the counted number is less than a predetermined number, 64-bit data outputted from the data shuffling unit 6011 is inputted in the data shuffling unit 6011 for reshuffling. If the counted number reaches the predetermined number, the stage number controlling unit 6012 outputs 64-bit output data of the data shuffling unit 6011 as a ciphertext block. In this embodiment, the predetermined number is set at 8.

Here, subkey data SK0 is used to perform first data shuffling for a plaintext block, and then data shuffling is repeated using subkey data SK1~SK7 in sequence. Subkey data SK0 is used again after subkey data SK7.

Figure 17:
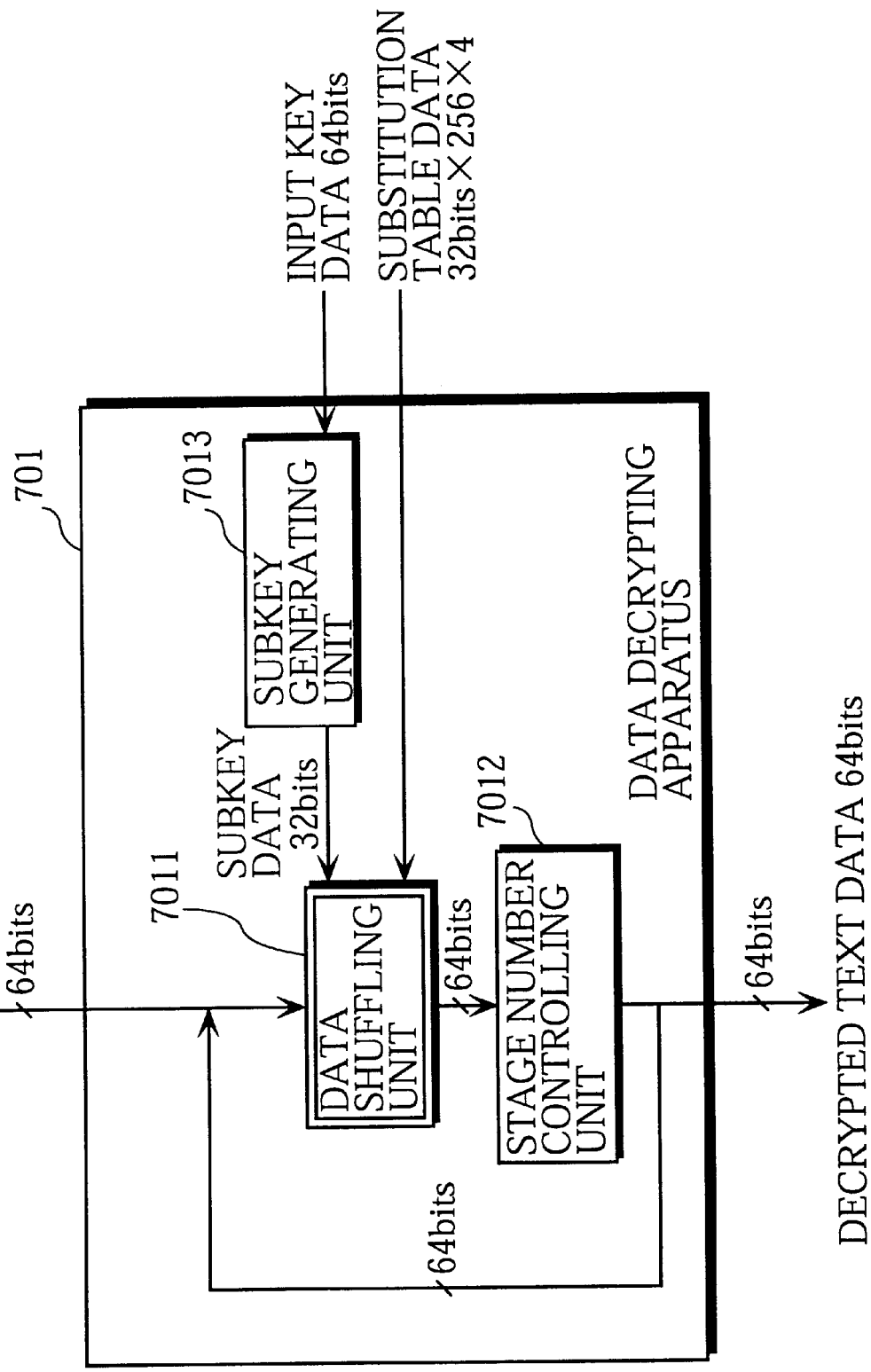
FIG. 17 shows the detailed construction of a data decrypting unit 701 shown in FIG. 15.

FIG. 17 shows the detailed construction of the data decrypting unit 701 shown in FIG. 15.

This data decrypting unit 701 is roughly made up of a data shuffling unit 7011, a stage number controlling unit 7012, and a subkey generating unit 7013.

The subkey generating unit 7013 and the data shuffling unit 7011 are the same as the subkey generating unit 6013 and the data shuffling unit 6011 shown in FIG. 16.

The stage number controlling unit 7012 controls the number of times data shuffling is performed by the data shuffling unit 7011 to generate a plaintext block from a ciphertext block. The stage number controlling unit 7012 counts the number of times data shuffling is performed for each ciphertext block. If the counted number is less than a predetermined number, 64-bit data outputted from the data shuffling unit 7011 is inputted in the data shuffling unit 7011 for reshuffling. If the counted number reaches the predetermined number, the stage number controlling unit 7012 outputs 64-bit output data of the data shuffling unit 7011 as a plaintext block. In this embodiment, the predetermined number is set at 8.

Here, subkey data SK7 is used to perform first data shuffling for a ciphertext block, and then data shuffling is repeated using subkey data SK6~SK0 in sequence. Subkey data SK7 is used again after subkey data SK0.

Note that the constructions of the data shuffling unit 6011 and the data shuffling unit 7011 in FIGS. 16 and 17 are respectively the same as the data shuffling unit 3011 and the data shuffling unit 4011 shown in FIGS. 3 and 4.

FIG. 18 shows the correspondence of block No. t, actual key data, input key data, and substitution table data. Here, block No. t shows the number, starting from 0, assigned to each plaintext block which has been generated by dividing input plaintext data from the highest-order bit in units of 64 bits. In the figure, actual key data "−" indicates no output from the key controlling unit 604, "(+)" denotes an exclusive-OR operation, "IV" denotes the initial block IV, "Ct" denotes a ciphertext block obtained by encrypting the "t"th plaintext block, and "TG(K[i])" denotes substitution table data generated from actual key data K[i] (i=0, 1, ..., 9).

As shown in FIG. 18, input key data is reset at K[i] (+)IV (i=0, 1, ..., 9) for every 32 plaintext blocks. Also, actual key data is outputted from the key controlling unit 604 for every 1024 plaintext blocks, and as a result substitution table data and input key data are renewed.

One example of the general operation of the encrypted communication system of the third embodiment will be given below.

The transmitter 6 in FIG. 13 encrypts input plaintext data in units of 64 bits using encryption key data stored in advance. In the following, each 64-bit plaintext block obtained by dividing the plaintext data from the highest-order bit is referred to as plaintext block Pt (t=0, 1, ...).

(1) First, plaintext block P0 is encrypted as follows.

The key controlling unit 604 in FIG. 14 outputs actual key data K[0] generated from the encryption key data, for the use of encrypting plaintext block P0.

The substitution table data generating unit 602 in FIG. 14 generates substitution table data TG(K[0]) from actual key data K[0] received from the key controlling unit 604 and outputs TG(K[0]) to the data encrypting unit 601.

The input key generating unit 603 in FIG. 14 performs an exclusive-OR operation for corresponding bits in actual key data K[0] and the initial block IV and outputs resultant input key data K[0](+)IV to the data encrypting unit 601.

The data encrypting unit 601 encrypts plaintext block P0 using substitution table data TG(K[0]) and input key data K[0](+)IV to generate ciphertext block C0.

(2) Next, plaintext block P1 is encrypted as follows.

Since the key controlling unit 604 does not output new actual key data, the substitution table data generating unit 602 does not generate new substitution table data.

The input key generating unit 603 performs an exclusive-OR operation for corresponding bits in actual key data K[0] and ciphertext block C0 and outputs resultant input key data K[0](+)C0 to the data encrypting unit 601.

The data encrypting unit 601 encrypts plaintext block P1 using substitution table data TG(K[0]) and input key data K[0](+)C0 to generate ciphertext block C1.

(3) Plaintext blocks P2~P31 are encrypted in the same way as plaintext block P1.

(4) Plaintext block P32 is encrypted as follows.

Since the key controlling unit 604 does not output new actual key data, the substitution table data generating unit 602 does not generate new substitution table data.

The input key generating unit 603 performs an exclusive-OR operation for corresponding bits in actual key data K[0] and the initial block IV and outputs resultant input key data K[0](+)IV to the data encrypting unit 601.

The data encrypting unit 601 encrypts plaintext block P32 using substitution table data TG(K[0]) and input key data K[0](+)IV to generate ciphertext block C32.

(5) Plaintext blocks P33~P63 are encrypted in the same way as plaintext block P1.

(6) The same encryption processing as plaintext blocks P32~P63 is repeated until plaintext block P1023.

(7) Plaintext block P1024 is encrypted as follows.

The key controlling unit 604 outputs actual key data K[1] generated from the encryption key data, for the use of encrypting plaintext block P1024.

The substitution table data generating unit 602 generates substitution table data TG(K[1]) from actual key data K[1] received from the key controlling unit 604, and outputs TG(K[1]) to the data encrypting unit 601.

The input key generating unit 603 performs an exclusive-OR operation for corresponding bits in actual key data K[1] and the initial block IV and outputs resultant input key data K[1](+)IV to the data encrypting unit 601.

The data encrypting unit 601 encrypts plaintext block P1024 using substitution table data TG(K[1]) and input key data K[1](+)IV to generate ciphertext block C1024.

(8) Plaintext block P1025 is encrypted as follows.

Since the key controlling unit 604 does not output new actual key data, the substitution table data generating unit 602 does not generate new substitution table data.

The input key generating unit 603 performs an exclusive-OR operation for corresponding bits in actual key data K[1] and ciphertext block C1024 and outputs resultant input key data K[1](+)C1024 to the data encrypting unit 601.

The data encrypting unit 601 encrypts plaintext block P1025 using substitution table data TG(K[1]) and input key data K[1](+)C1024 to generate ciphertext block C1025.

(9) The same encryption processing as plaintext blocks P0~P1023 is repeated until the last plaintext block.

(10) Decryption processing for ciphertext blocks is the reverse conversion of the above encryption processing (1)~(9) and differs only in that the object whose exclusive-OR with actual key data is to be calculated is not a ciphertext block generated by the data encrypting unit 601 but a ciphertext block immediately preceding a ciphertext block to be decrypted by the data decrypting unit 701.

The principle behind encryption of plaintext data by the data encrypting apparatus 60 and recovery of the plaintext data by the data decrypting apparatus 70 will be explained using formulas below.

In this explanation, the initial letter "e" of "encryption" is added to each legend concerning encryption processing, and the initial letter "d" of "decryption" is added to each legend concerning decryption processing.

The key controlling unit 604 outputs actual key data Ke[k mod 10] when plaintext block Pe(1024×k) (k=0, 1, ...) is to be encrypted. Otherwise, the key controlling unit 604 does not output actual key data.

The substitution table data generating unit 602 generates substitution table data from actual key data Ke[k mod 10] received from the key controlling unit 604 and outputs the substitution table data, when plaintext block Pe(1024×k) is to be encrypted. Otherwise, the substitution table data generating unit 602 does not generate substitution table data.

The input key generating unit 603 finds an exclusive-OR for corresponding bits in initial block IVe and actual key data Ke[(((32×j)−((32×j) mod 1024))/1024) mod 10] and outputs the calculation result as input key data, when plaintext block Pe(32×j) (j=0, 1, ...) is to be encrypted. When plaintext block Pet aside from plaintext block Pe(32×j) is to be encrypted, the input key generating unit 603 finds an exclusive-OR for corresponding bits in ciphertext block Ce(t−1) and actual key data Ke[((t−(t mod 1024))/1024) mod 10] and outputs the calculation result as input key data.

In other words, when t=(32×j) (j=0, 1, ...), input key data IKet used for encrypting plaintext block Pet is $$IKet = Ke[((t-(t \bmod 1024))/1024) \bmod 10](+)IVe \quad \text{(Formula 21)}$$

Meanwhile, when t≠(32×j) (j=0, 1, ...), input key data IKet used for encrypting plaintext block Pet is $$IKet = Ke[((t-(t \bmod 1024))/1024) \bmod 10](+)Ce(t-1) \quad \text{(Formula 22)}$$

When i=((t−(t mod 1024))/1024) mod 10, substitution table data is TGe(Ke[i]), and 64-bit ciphertext block Cet obtained by encrypting plaintext block Pet (t=0, 1, ...) is $$Cet = Enc(Pet, TGe(Ke[i]), IKet) \quad \text{(Formula 23)}$$

where "Enc" denotes encryption processing performed in the data encrypting unit 601.

Thus, the data encrypting unit 601 encrypts each plaintext block Pet using input key data IKet and substitution table data TGe(Ke[i]) to generate ciphertext block Cet=Enc(Pet, TGe(Ke[i]), IKet).

The key controlling unit 704 outputs actual key data Kd[k mod 10] when ciphertext block Cd(1024×k) (k=0, 1, ...) is to be decrypted. Otherwise, the key controlling unit 704 does not output actual key data.

The substitution table data generating unit 702 generates substitution table data from actual key data Kd[k mod 10] received from the key controlling unit 704 and outputs the substitution table data, when ciphertext block Cd(1024×k) is to be decrypted. Otherwise, the substitution table data generating unit 702 does not generate substitution table data.

The input key generating unit 703 finds an exclusive-OR for corresponding bits in initial block IVd and actual key data Kd[(((32×j)−((32×j) mod 1024))/1024) mod 10] and outputs the calculation result as input key data, when ciphertext block Cd(32×j) (j=0, 1, ...) is to be decrypted. When ciphertext block Cdt aside from ciphertext block Cd(32×j) is to be decrypted, the input key generating unit 703 finds an exclusive-OR for corresponding bits in ciphertext block Cd(t−1) and actual key data Kd[((t−(t mod 1024))/1024) mod 10] and outputs the calculation result as input key data.

In other words, when $t=(32\times j)$ $(j=0, 1, \ldots)$, input key data IKdt used for decrypting ciphertext block Cdt is $$IKdt=Kd[((t-(t \bmod 1024))/1024) \bmod 10](+)IVd \quad \text{(Formula 24)}$$

Meanwhile, when $t \neq (32\times j)$ $(j=0, 1, \ldots)$, input key data IKdt used for decrypting ciphertext block Cdt is $$IKdt=Kd[((t-(t \bmod 1024))/1024) \bmod 10](+)Cd(t-1) \quad \text{(Formula 25)}$$

When $i=((t-(t \bmod 1024))/1024) \bmod 10$, substitution table data is TGd(Kd[i]), and 64-bit decrypted text block Ddt obtained by decrypting ciphertext block Cdt $(t=0, 1, \ldots)$ is $$Ddt=Dec(Cdt,TGd(Kd[i]),IKdt) \quad \text{(Formula 26)}$$

where "Dec" denotes decryption processing performed in the data decrypting unit 701.

Thus, the data decrypting unit 701 decrypts each ciphertext block Cdt using input key data IKdt and substitution table data TGd(Kd[i]) to generate decrypted text block Ddt=Dec(Cdt,TGd(Kd[i]),IKdt).

When a ciphertext block string obtained by the data encrypting apparatus 60 encrypting a plaintext block string (Pe0, Pe1, . . . ) using a given pair of actual key data and initial block is decrypted by the data decrypting apparatus 70 using the same actual key data and initial block, the obtained decrypted text block string (Dd0, Dd1, . . . ) is the same as the original plaintext block string. This will be proved below. Note here that, since the substitution table data generating unit 602 and the substitution table data generating unit 702 have the same function, substitution table data generated by the substitution table data generating unit 602 using actual key data will be identical to substitution table data generated by the substitution table data generating unit 702 using the same actual key data.

(1) Since the data encrypting apparatus 60 and the data decrypting apparatus 70 use the same actual key data, $$Ke=Kd$$

Hereinafter, Ke and Kd are both referred to as actual key data Ks.

(2) Since the data encrypting apparatus 60 and the data decrypting apparatus 70 use the same initial block, $$IVe=IVd$$

Hereinafter, IVe and IVd are both referred to as initial block IVs.

(3) Since a ciphertext block string generated by the data encrypting apparatus 60 is decrypted by the data decrypting apparatus 70, $$Cet=Cdt$$

Hereinafter, Cet and Cdt are both referred to as ciphertext block Cst.

(4) According to (1), (2), and Formula 21, when $t=(32\times j)$ $(j=0, 1, \ldots)$, input key data IKet used for encrypting plaintext block Pet is $$IKet=Ks[((t-(t \bmod 1024))/1024) \bmod 10](+)IVs \quad \text{(Formula 27)}$$

(5) According to (1), (2), and Formula 24, when $t=(32\times j)$ $(j=0, 1, \ldots)$, input key data IKdt used for decrypting ciphertext block Cst is $$IKdt=Ks[((t-(t \bmod 1024))/1024) \bmod 10](+)IVs \quad \text{(Formula 28)}$$

(6) The right side of Formula 27 and the right side of Formula 28 are equal, so that when $t=(32\times j)$ $(j=0, 1, \ldots)$, $$IKet=IKdt$$

(7) According to (1), (3), and Formula 22, when $t \neq (32\times j)$ $(j=0, 1, \ldots)$, input key data IKet used for encrypting plaintext block Pet is $$IKet=Ks[((t-(t \bmod 1024))/1024) \bmod 10](+)Cs(t-1) \quad \text{(Formula 29)}$$

(8) According to (1), (3), and Formula 25, when $t \neq (32\times j)$ $(j=0, 1, \ldots)$, input key data IKdt used for decrypting ciphertext block Cdt is $$IKdt=Ks[((t-(t \bmod 1024))/1024) \bmod 10](+)Cs(t-1) \quad \text{(Formula 30)}$$

(9) The right side of Formula 29 and the right side of Formula 30 are equal, so that when $t \neq (32\times j)$ $(j=0, 1, \ldots)$, $$IKet=IKdt$$

(10) From (6) and (9), it is clear that $$IKet=IKdt$$

both when $t=(32\times j)$ $(j=0, 1, \ldots)$ and when $t \neq (32\times j)$ $(j=0, 1, \ldots)$.

Therefore, IKet and IKdt are hereafter both referred to as input key data IKst.

(11) Since the substitution table data generating unit 602 and the substitution table data generating unit 702 have the same function, $$TGe(Ks[i])=TGd(Ks[i])$$

Accordingly, TGe(Ks[i]) and TGd(Ks[i]) are hereafter both referred to as substitution table data TGs(Ks[i]).

(12) According to (10), (11), and Formula 23, 64-bit ciphertext block Cst obtained by encrypting plaintext block Pet $(t=0, 1, \ldots)$ is expressed as $$Cst=Enc(Pet,TGs(Ks[i]),IKst) \quad \text{(Formula 31)}$$

(13) According to (10), (11), and Formula 26, 64-bit decrypted text block Ddt obtained by decrypting ciphertext block Cst $(t=0, 1, \ldots)$ is expressed as $$Ddt=Dec(Cst,TGs(Ks[i]),IKst) \quad \text{(Formula 32)}$$

(14) When Formula 31 is substituted into Formula 32, the result is $$Ddt=Dec(Enc(Pet,TGs(Ks[i]),IKst),TGs(Ks[i]),IKst) \quad \text{(Formula 33)}$$

(15) Same as the principle behind encryption of plaintext data by the data shuffling unit 101 and recovery of the plaintext data by the data shuffling unit 201 in the first embodiment, when the data encrypting unit 601 encrypts plaintext block $\alpha$ using 32K-bit substitution table data $\beta$ and 64-bit input key data $\gamma$ to generate a ciphertext block and the data decrypting unit 701 decrypts the ciphertext block using the same substitution table data $\beta$ and 64-bit input key data $\gamma$, a decrypted text block obtained by the data decrypting unit 701 is the same as original plaintext block $\alpha$. That is, $$Dec(Enc(\alpha,\beta,\gamma), \beta, \gamma)=\alpha \quad \text{(Formula 34)}$$

(16) From Formulas 33 and 34, it is proved that $$\text{(decrypted text block } Ddt)=\text{(plaintext block } Pet) \quad \text{(Formula 35)}$$

The security of the data encrypting apparatus 60 will be explained below. The security of this data encrypting apparatus 60 greatly depends on the security of the data encrypting unit 601. In the present embodiment, when actual key data is expressed as CKt, input key data IKt inputted in the data encrypting unit 601 is expressed as $$IKt=CKt(+)IV \text{ (where } t=k\times32)$$

$$IKt=CKt(+)C(t-1) \text{ (where } t\neq k\times32) \quad \text{(Formula 36)}$$

where k=0, 1, . . . .

In Formula 36, though ciphertext block C(t-1) is known to cryptanalysts, initial block IV and actual key data CKt which is outputted from the key controlling unit 604 are unknown to the cryptanalysts, so that input key data IKt is unknown to the cryptanalysts. Accordingly, even if the cryptanalysts simulate the data encrypting unit 601 on a computer by known-plaintext attack, it is impossible to find the encryption key data.

Also, since input key data is renewed whenever a new plaintext block is encrypted in the present embodiment, cryptographic security is further ensured compared with the case where the same input key data is used for all plaintext blocks.

Also, since substitution table data is renewed every time 1024 plaintext blocks are encrypted in the present embodiment, cryptographic security is further ensured compared with the case where the same substitution table data is used for all plaintext blocks.

Furthermore, in the present embodiment generation of 32K-bit substitution table data is performed only when encryption is performed 1024 times. Since generation of 32K-bit substitution table data takes much more time than generation of eight sets of 32-bit subkey data performed in the data encrypting unit 601, the data encrypting apparatus 60 maintains high cryptographic security without losing processing speed as in the case of the third conventional example.

While the input key generating units 603 and 703 have performed exclusive-OR operations on two sets of 64-bit data in the third embodiment, the same effect can be achieved with other data merging methods.

While 64-bit actual key data has been generated by the key controlling units 604 and 704 in the third embodiment, the length of actual key data is not limited to 64 bits. Actual key data smaller than 64 bits, such as 40-bit actual key data, can be used, by modifying the data merging operations in the input key generating units 603 and 703 so that output data will be 64 bits long.

In the third embodiment, a ciphertext block generated in an immediately preceding encryption process has been inputted in the input key generating unit 603. However, any 64-bit data obtained during the immediately preceding encryption process can be used instead of the ciphertext block. Also, this data may not necessarily be 64 bits long. Data smaller than 64 bits, such as 40-bit data, can be used by modifying the data merging operation in the input key generating unit 603 so that output data will be 64 bits long. The same applies to the data decrypting apparatus 70.

While the data encrypting unit 601 and the data decrypting unit 701 have used the Blowfish cipher in the third embodiment, any block cipher which generates substitution table data based on key data may instead be used.

In the third embodiment, encryption key data composed of 10 sets of 64-bit actual key data has been stored in each of the transmitter 6 and the receiver 7. Alternatively, a set of 64-bit actual key data to be first used for cryptographic processing may be stored in each of the transmitter 6 and the receiver 7, and the other sets of 64-bit actual key data following the first set of 64-bit actual key data may be encrypted in the transmitter 6 together with plaintext data and sent to the receiver 7. Alternatively, encryption key data may be distributed using a public-key cryptosystem such as the Diffie-Hellman scheme.

In the first to third embodiments, a data encrypting apparatus has encrypted input plaintext data to generate ciphertext data and a data decrypting apparatus has decrypted the ciphertext data. However, the data encrypting apparatus and the data decrypting apparatus can each be used for both encryption and decryption, since decryption by the data decrypting apparatus is the reverse conversion of encryption by the data encrypting apparatus. Therefore, the data decrypting apparatus may encrypt input plaintext data to generate ciphertext data and the data encrypting apparatus may decrypt the ciphertext data.

While each of the above embodiments has been described as hardware such as a logic IC in this specification, the present invention can also be implemented by software. By storing the software on computer-readable storage mediums such as a CD-ROM, any of production, utilization, transference, lending, importation, and proposition for transference/lending with regard to the present invention is possible as in the case of the hardware.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An encryption or decryption apparatus including data conversion means for performing a data conversion on input data using a plurality of sets of substitution data to generate output data, wherein the encryption or decryption apparatus uses a cipher that corresponds to a conventional cipher which uses a F function, the data conversion means corresponds to a device for performing the F function of the conventional cipher, and the device for performing the F function of the conventional cipher (a) stores $(2^N)\times M$ sets of substitution data that are each $(N\times M)$ bits long, (b) acquires input data of $(N\times M)$ bits that is subjected to a data conversion, (c) generates M sets of N-bit subdata from the input data of $(N\times M)$ bits, (d) receives the M sets of N-bit subdata, specifies M sets of $(N\times M)$-bit substitution data from the $(2^N)\times M$ sets of substitution data, and outputs the M sets of $(N\times M)$-bit substitution data, and (e) generates output data of $(N\times M)$ bits based on the M sets of $(N\times M)$-bit substitution data, where N is an integer no less than 2 and M is an integer no less than 2, the data conversion means comprising:

storing means for storing $(2^M)$ sets of substitution data that each have a predetermined number of bits, the predetermined number being equal to or less than $(N\times M)$, wherein the total size of substitution data stored in the storing means is no greater than 1/M the total size of substitution data stored in the device for performing the F function of the conventional cipher;

acquiring means for acquiring input data that is subjected to a data conversion, the input data being $(N\times M)$ bits long;

subdata generating means for generating at least one set of N-bit subdata from the input data acquired by the acquiring means;

substituting means for receiving the at least one set of subdata generated by the subdata generating means, specifying one of the (2^N) sets of substitution data in the storing means for each of the at least one set of subdata, and outputting at least one set of substitution data specified respectively for the at least one set of subdata;

fixed conversion performing means for performing a plurality of different fixed conversions on the at least one set of substitution data outputted from the substituting means, to generate M sets of converted data that each have the predetermined number of bits; and output data generating means for generating output data that is (N×M) bits long, based on the M sets of converted data generated by the fixed conversion performing means.

2. The encryption or decryption apparatus of claim 1, wherein the plurality of different fixed conversions performed by the fixed conversion performing means are respectively rotations by different bit shift lengths.

3. The encryption or decryption apparatus of claim 2, further comprising:

key acquiring means for acquiring a set of key data; and, rotation determining means for determining a bit shift length of a rotation to be performed by the fixed conversion performing means as each of the plurality of different fixed conversions, based on the set of key data acquired by the key acquiring means.

4. The encryption or decryption apparatus of claim 1, wherein the predetermined number is (N×M), wherein the subdata generating means includes dividing means for dividing the (N×M)-bit input data into M sets of N-bit subdata, wherein the substituting means specifies M sets of (N×M)-bit substitution data, among the (2^N) sets of substitution data in the storing means, respectively, for the M sets of subdata generated by the dividing means, and outputs the specified M sets of substitution data, wherein the fixed conversion performing means performs M different fixed conversions respectively on the M sets of substitution data outputted from the substituting means, to generate the M sets of (N×M)-bit converted data, and, wherein the output data generating means performs a merge process on the M sets of converted data generated by the fixed conversion performing means, to generate the (N×M)-bit output data.

5. The encryption or decryption apparatus of claim 4, wherein the merge process by the output data generating means is made up of at least one operation out of: arithmetic add operations; and exclusive-OR operations for corresponding bits.

6. The encryption or decryption apparatus of claim 1, wherein the predetermined number is N, wherein the subdata generating means includes:

dividing means for dividing the (N×M)-bit input data into M sets of N-bit partial data; and input merging means for performing a global merge process on the M sets of partial data to generate a set of N-bit subdata, wherein the substituting means specifies one of the (2^N) sets of N-bit substitution data in the storing means for the set of subdata generated by the input merging means, and outputs the specified set of substitution data, wherein the fixed conversion performing means performs M different fixed conversions separately on the set of substitution data outputted from the substituting means, to generate the M sets of N-bit converted data, and wherein the output data generating means includes:

output merging means for performing an individual merge process on each of the M sets of partial data and a different one of the M sets of converted data that corresponds to the set of partial data, to generate M sets of N-bit output merged data; and, combining means for combining the. M sets of output merged data generated by the output merging means, to generate the (N×M)-bit output data.

7. The encryption or decryption apparatus of claim 6, wherein the global merge process by the input merging means is made up of at least one operation out of: arithmetic add operations; and exclusive-OR operations for corresponding bits.

8. The encryption or decryption apparatus of claim 6, wherein the global merge process by the input merging means is to perform, after a plurality of different fixed conversions are performed on the M sets of subdata generated by the dividing means, at least one operation out of: arithmetic add operations; and exclusive-OR operations for corresponding bits.

9. The encryption or decryption apparatus of claim 6, wherein each individual merge process performed by the output merging means is any of an arithmetic add operation and an exclusive-OR operation for corresponding bits.

10. An encryption or decryption method including a data conversion method that, in an encryption or decryption apparatus equipped with a storing device storing (2^N) sets of substitution data which each have a predetermined number of bits, performs a data conversion on input data using the (2^N) sets of substitution data to generate output data, the predetermined number being equal to or less than (N×M), N being an integer no less than 2, and M being an integer no less than 2, wherein the encryption or decryption apparatus uses a cipher that corresponds to a conventional cipher which uses a F function, the data conversion method performs the F function of the conventional cipher, and a device for performing the F function of the conventional cipher (a) stores (2^N)×M sets of substitution data that are each (N×M) bits long, (b) acquires input data of (N×M) bits that is subjected to a data conversion, (c) generates M sets of N-bit subdata from the input data of (N×M) bits, (d) receives the M sets of N-bit subdata, specifies M sets of (N×M)-bit substitution data from the (2^N)×M sets of substitution data, and outputs the M sets of (N×M)-bit substitution data, and (e) generates output data of (N×M) bits based on the M sets of (N×M)-bit substitution data, where N is an integer no less than 2 and M is an integer no less than 2, the data conversion method comprising:

a storing step for storing (2^N) sets of substitution data that each have a predetermined number of bits, the predetermined number being equal to or less than (N×M), wherein the total size of substitution data stored in the storing means is no greater than 1/M the total size of substitution data stored in the device for performing the F function of the conventional cipher;

an acquiring step for acquiring the input data that is subjected to the data conversion, the input data being (N×M) bits long;

a subdata generating step for generating at least one set of N-bit subdata from the input data acquired in the acquiring step;

a substituting step for receiving the at least one set of subdata generated in the subdata generating step, specifying one of the ($2^N$) sets of substitution data in the storing device for each of the at least one set of subdata, and outputting at least one set of substitution data specified respectively for the at least one set of subdata;

a fixed conversion performing step for performing a plurality of different fixed conversions on the at least one of substitution data outputted in the substituting step, to generate M sets of converted data that each have the predetermined number of bits; and an output data generating step for generating the output data that is (N×M) bits long, based on the M sets of converted data generated by the fixed conversion performing step.

11. The encryption or decryption method of claim 10, wherein the predetermined number is (N×M), wherein the subdata generating step includes a dividing substep for dividing the (N×M)-bit input data into M sets of N-bit subdata, wherein the substituting step specifies M sets of (N×M)-bit substitution data, among the ($2^N$) sets of substitution data in the storing device, respectively for the M sets of subdata generated in the dividing substep, and outputs the specified M sets of substitution data, wherein the fixed conversion performing step performs M different fixed conversions respectively on the M sets of substitution data outputted by the substituting step, to generate the M sets of (N×M)-bit converted data, and wherein the output data generating step performs a merge process on the M sets of converted data generated in the fixed conversion performing step, to generate the (N×M)-bit output data.

12. The encryption or decryption method of claim 10, wherein the predetermined number is N, wherein the subdata generating step includes:
a dividing step for dividing the (N×M)-bit input data into M sets of N-bit partial data; and
wherein the substituting step specifies one of the ($2^N$) sets of N-bit substitution data in the storing device for the set of subdata generated in the input merging substep, and outputs the specified set of substitution data, wherein the fixed conversion performing step performs M different fixed conversions separately on the set of substitution data outputted by the substituting step, to generate the M sets of N-bit converted data, and, wherein the output data generating step includes:
an output merging substep for performing an individual merge process on each of the M sets of partial data and a different one of the M sets of converted data that corresponds to the set of partial data, to generate M sets of N-bit output merged data; and,
a combining substep for combining the M sets of output merged data generated by the output merging substep, to generate the (N×M)-bit output data.

13. A computer-readable storage medium storing an encryption or decryption program including a data conversion program that, in an encryption or decryption apparatus equipped with a storing device storing ($2^N$) sets of substitution data which each have a predetermined number of bits, performs a data conversion on input data using the ($2^N$) sets of substitution data to generate output data, the predetermined number being equal to or less than (N×M), N being an integer no less than 2, and M being an integer no less than 2, wherein the encryption or decryption apparatus uses a cipher that corresponds to a conventional cipher which uses a F function, the data conversion means corresponds to a device for performing the F function of the conventional cipher, and the device for performing the F function of the conventional cipher (a) stores ($2^N$)×M sets of substitution data that are each (N×M) bits long, (b) acquires input data of (N×M) bits that is subjected to a data conversion, (c) generates M sets of N-bit subdata from the input data of (N×M) bits, (d) receives the M sets of N-bit subdata, specifies M sets of (N×M)-bit substitution data from the ($2^N$)×M sets of substitution data, and outputs the M sets of (N×M)-bit substitution data, and (e) generates output data of (N×M) bits based on the M sets of (N×M)-bit substitution data, where N is an integer no less than 2 and M is an integer no less than 2, the data conversion program comprising:

a storing step for storing ($2^N$) sets of substitution data that each have a predetermined number of bits, the predetermined number being equal to or less than (N×M), wherein the total size of substitution data stored in the storing means is no greater than 1/M the total size of substitution data stored in the device for performing the F function of the conventional cipher;

an acquiring step for acquiring the input data that is subjected to the data conversion, the input data being (N×M) bits long;

a subdata generating step for generating at least one set of N bit subdata from the input data acquired in the acquiring step;

a substituting step for receiving the at least one set of subdata generated in the subdata generating step, specifying one of the ($2^N$) sets of substitution data in the storing device for each of the at least one set of subdata, and outputting at least one set of substitution data specified respectively for the at least one set of subdata;

a fixed conversion performing step for performing a plurality of different fixed conversions on the at least one set of substitution data outputted in the substituting step, to generate M sets of converted data that each have the predetermined number of bits; and an output data generating step for generating the output data that is (N×M) bits long, based on the M sets of converted data generated by the fixed conversion performing step.

14. The storage medium of claim 13, wherein the predetermined number is (N×M), wherein the subdata generating step includes a dividing substep for dividing the (N×M)-bit input data into M sets of N-bit subdata, wherein the substituting step specifies M sets of (N×M)-bit substitution data, among the ($2^N$) sets of substitution data in the storing device, respectively for the M sets of subdata generated in the dividing substep, and outputs the specified M sets of substitution data, wherein the fixed conversion performing step performs M different fixed conversions respectively on the M sets of substitution data outputted by the substituting step, to generate the M sets of (N×M)-bit converted data, and wherein the output data generating step performs a merge process on the M sets of converted data generated in the fixed conversion performing step to, generate the (N×M)-bit output data.

15. The storage medium of claim 13, wherein the predetermined number is N, wherein the subdata generating step includes:
- a dividing substep for dividing the (N×M)-bit input data into M sets of N-bit partial data; and
- an input merging substep for performing a global merge process on the M sets of partial data to generate a set of N-bit subdata, wherein the substituting step specifies one of the (2^N) sets of N-bit substitution data in the storing device for the set of subdata generated in the input merging substep, and outputs the specified set of substitution data, wherein the fixed conversion performing step performs M different fixed conversions separately on the set of substitution data outputted by the substituting step, to generate the M sets of N-bit converted data, and wherein the output data generating step includes:
- an output merging substep for performing an individual merge process on each of the M sets of partial data and a different one of the M sets of converted data that corresponds to the set of partial data, to generate M sets of N-bit output merged data; and
- a combining substep for combining the M sets of output merged data generated by the output merging substep, to generate the (N×M)-bit output data.

* * * * *